(12) United States Patent
Dobson et al.

(10) Patent No.: US 7,634,267 B2
(45) Date of Patent: Dec. 15, 2009

(54) NETWORK TESTING AND MONITORING SYSTEMS

(75) Inventors: Robert William Albert Dobson, London (GB); Yiu Fai Ko, London (GB)

(73) Assignee: Actix Limited (GB)

( * ) Notice: Subject to any disclaimer, the term of this patent is extended or adjusted under 35 U.S.C. 154(b) by 0 days.

(21) Appl. No.: 11/824,909

(22) Filed: Jul. 3, 2007

(65) Prior Publication Data

US 2007/0254644 A1 Nov. 1, 2007

Related U.S. Application Data

(63) Continuation of application No. 11/789,133, filed on Apr. 24, 2007, which is a continuation of application No. 10/850,364, filed on May 20, 2004, now Pat. No. 7,224,968, which is a continuation-in-part of application No. 10/039,220, filed on Jan. 4, 2002, now Pat. No. 7,062,264, and a continuation-in-part of application No. PCT/GB02/05245, filed on Nov. 22, 2002.

(30) Foreign Application Priority Data

Nov. 23, 2001 (GB) ................................. 0128168.2

(51) Int. Cl.
*H04Q 7/20* (2006.01)
(52) U.S. Cl. ................. 455/423; 455/67.11; 455/226.1; 455/456.1; 455/422; 455/445
(58) Field of Classification Search ................. 455/423, 455/456.1, 67.11, 226, 432, 424
See application file for complete search history.

(56) References Cited

U.S. PATENT DOCUMENTS 4,552,997 A 11/1985 Daniels et al.

(Continued)

FOREIGN PATENT DOCUMENTS

EP 848567 A1 6/1998

(Continued)

OTHER PUBLICATIONS

"PCT International Search Report, International Application No. PCT/GB02/05245", Received May 27, 2003,(May 13, 2003),3 pages.

(Continued)

*Primary Examiner*—Charles N Appiah
*Assistant Examiner*—Michael T Vu
(74) *Attorney, Agent, or Firm*—Schwegman, Lundberg & Woessner, P.A.

(57) ABSTRACT

A method of testing a digital mobile phone network such as a GPRS or 3G network comprises either using real traffic or creating test traffic using test mobile phone coupled to a computer, and using the computer to measure a parameter associated with the network's response to the traffic. The measurements made by the computer are themselves sent as traffic to create one or more data streams within the mobile phone network comprising the traffic, measurements relating to the traffic, and signalling relating to the traffic, whereby this data stream or these streams can be captured at interface points within the network and analysed to investigate the functioning of the network dynamically as the network is exercised with the traffic. Software and test equipment for performing the method are also described.

17 Claims, 14 Drawing Sheets

U.S. PATENT DOCUMENTS

| | | | |
|---|---|---|---|
| 4,775,973 | A | 10/1988 | Tomberlin et al. |
| 5,276,676 | A | 1/1994 | Horn et al. |
| 5,677,912 | A | 10/1997 | Smith |
| 5,724,510 | A | 3/1998 | Arndt et al. |
| 5,737,517 | A | 4/1998 | Kite et al. |
| 5,875,398 | A | 2/1999 | Snapp |
| 5,881,051 | A | 3/1999 | Arrowood et al. |
| 5,901,141 | A | 5/1999 | Gruber et al. |
| 6,011,830 | A | 1/2000 | Sasin et al. |
| 6,041,041 | A | 3/2000 | Ramanathan et al. |
| 6,088,587 | A | 7/2000 | Abbadessa |
| 6,088,588 | A | 7/2000 | Osborne |
| 6,192,244 | B1 | 2/2001 | Abbadessa |
| 6,219,544 | B1 * | 4/2001 | Suutarinen ................ 455/423 |
| 6,266,514 | B1 | 7/2001 | O'Donnell |
| 6,279,001 | B1 | 8/2001 | DeBettencourt et al. |
| 6,285,875 | B1 | 9/2001 | Alajoki et al. |
| 6,314,463 | B1 | 11/2001 | Abbott et al. |
| 6,317,786 | B1 | 11/2001 | Yamane et al. |
| 6,331,987 | B1 | 12/2001 | Beser |
| 6,332,158 | B1 | 12/2001 | Risley et al. |
| 6,351,773 | B1 | 2/2002 | Fijolek et al. |
| 6,363,429 | B1 | 3/2002 | Ketcham |
| 6,370,147 | B1 | 4/2002 | Beser |
| 6,389,422 | B1 | 5/2002 | Doi et al. |
| 6,408,335 | B1 | 6/2002 | Schwaller et al. |
| 6,412,006 | B2 | 6/2002 | Nandus |
| 6,442,158 | B1 | 8/2002 | Beser |
| 6,457,143 | B1 | 9/2002 | Yue |
| 6,480,469 | B1 | 11/2002 | Moore et al. |
| 6,505,201 | B1 | 1/2003 | Haitsuka et al. |
| 6,510,162 | B1 | 1/2003 | Fijolek |
| 6,535,733 | B1 | 3/2003 | Matusevich et al. |
| 6,539,340 | B1 | 3/2003 | Robins et al. |
| 6,560,442 | B1 | 5/2003 | Yost et al. |
| 6,757,543 | B2 * | 6/2004 | Moran et al. ............. 455/456.1 |
| 7,062,264 | B2 | 6/2006 | Ko et al. |
| 7,224,968 | B2 | 5/2007 | Dobson et al. |
| 7,319,847 | B2 * | 1/2008 | Xanthos et al. .......... 455/67.11 |
| 2001/0031625 | A1 | 10/2001 | Lynn |
| 2005/0130645 | A1 | 6/2005 | Albert Dobson et al. |
| 2005/0260982 | A1 | 11/2005 | Ko et al. |
| 2007/0195696 | A1 | 8/2007 | Dobson et al. |

FOREIGN PATENT DOCUMENTS

| | | |
|---|---|---|
| EP | 895435 | 2/1999 |
| WO | WO-99/12228 | 3/1999 |
| WO | WO-00/28755 | 5/2000 |
| WO | WO-00/28756 | 5/2000 |

OTHER PUBLICATIONS

"U.S. Appl. No. 10/850,364 Non Final Office Action mailed Jan. 26, 2006", 10 pgs.

"U.S. Appl. No. 10/850,364 Non Final Office Action mailed Jul. 13, 2006", 9 pgs.

"U.S. Appl. No. 10/850,364 Notice of Allowance mailed Jan. 12, 2007", 7 pgs.

"U.S. Appl. No. 10/850,364 Response filed Apr. 26, 2006 to Non Final Office Action mailed Jan. 26, 2006", 14 pgs.

"U.S. Appl. No. 10/850,364 Response filed Oct. 13, 2006 to Non Final Office Action mailed Jul. 13, 2006", 19 pgs.

\* cited by examiner

NETWORK TESTING AND MONITORING SYSTEMS

RELATED APPLICATIONS

This application is a continuation of U.S. patent application Ser. No. 11/789,133, filed Apr. 24, 2007, which is a continuation of U.S. patent application Ser. No. 10/850,364, filed May 20, 2004, now U.S. Pat. No. 7,224,968 which application is a continuation-in-part of U.S. patent application Ser. No. 10/039,220, filed Jan. 4, 2002 now U.S. Pat. No. 7,062,264 and a continuation under 35 U.S.C. 111(a) of PCT/GB02/05245, filed Nov. 22, 2002, and published in English on Jun. 5, 2003 as WO 03/047280 A2, which claimed priority to United Kingdom Application No. 0128168.2, filed Nov. 23, 2001, which applications and publications are incorporated herein by reference.

FIELD OF THE INVENTION

This invention is concerned with methods, apparatus, and software for testing mobile phone networks and is particularly suitable for testing data transmission over so-called 2.5G and 3G mobile phone networks.

BACKGROUND OF THE INVENTION

FIG. 1a shows a generic structure of a conventional mobile phone network such as a GSM-type mobile phone network. The network comprises a plurality of radio masts 102 serving a corresponding plurality of network cells 100. A base station (not shown in FIG. 1a) comprising a plurality of rf transmitters and receivers is colocated with each mast 102 and each base station is connected to one of a plurality of base station controllers 104. In a GSM-type network the base station is referred to as a Base Transceiver Station (BTS). The base stations and masts 102 provide two-way radio communication with mobile stations such as mobile station 116 within the cells 100. This allows two-way transmission of voice and data traffic to and from a mobile station.

The radio link between a base station and a mobile station is primarily managed by a base station and its associated base station controller. Together these handle radio channel set-up, cell-to-cell hand-overs (in the USA referred to hand-offs) and other radio resource control functions. The radio link carries both traffic, such as speech and data traffic, and control information used to dynamically control transmit power, to allocate radio channels to mobile stations and for signalling functions such as paging a mobile station to alert it to an incoming call.

The network has a hierarchical structure in which a plurality of base station controllers 104 is connected to a Mobile services Switching Centre (MSC) 106 for routing calls between cells served by different base station controllers. The MSCs 106 are in turn connected to a gateway MSC (GMSC) 108, which is connected to the standard Public Switched Telephone Network PSTN 114. A home location register (HLR) 110 and Visitor Location Register (VLR) 112 manage call routing and mobile station roaming; other systems not shown in FIG. 1a provide functions such as security and authentication and billing.

The basic structure of FIG. 1a is common to all mobile phone networks whether or not they are based on GSM, but the nomenclature may differ. For example in a 3G network a Base Transceiver Station is referred to as a Node B, and a Base Station Controller is referred to as a Radio Network Controller (RNC).

In FIG. 1a the cells 100 are shown schematically as a set of interlocking, non-overlapping coverage areas but in practice the coverage of neighbouring cells will overlap, particularly at the edges. The coverage may also have gaps where none of the local base stations provide sufficient signal for a mobile to operate adequately. Although in FIG. 1a the cells have been depicted as all being roughly the same size in practice cell size varies from several kilometres diameter down to pico cells, which are mainly indoor cells, with a diameter of less than 100 m. Interference between neighbouring cells is controlled by, among other things, controlling the transmission frequency and power of the base station and by using modelling programmes to carefully site the base station antennas.

It will be appreciated, even from this brief discussion, that network planning and management is complex. Although modelling can be of great assistance inevitably there is a heavy reliance upon practical network testing, particularly at the early stages of network design and implementation. Once a network has been established there is a continuing need for practical mobile phone network testing, both for troubleshooting complex problems, such as problems which might only appear in 1 in 1000 calls, and for competitive analysis, that is analysing the performance of a competitor's mobile phone network.

At present many mobile phone network operators test their networks by means of so-called drive testing. A mobile phone is loaded with dedicated drive testing software and connected via a serial cable to a portable computer running additional drive testing software. This is used to control the mobile to cause calls to be established in regular patterns to test network. Special instructions may be issued to the phone, for example to prevent hand-over, to find the edge of a cell, or the mobile may be instructed to make repeated calls in an attempt to reproduce a fault. During these test calls the portable computer gathers diagnostic information from the phone using the serial cable and stores this for later analysis. This diagnostic information generally includes air interface messaging sent and received by the phone in normal operation, that is during call set-up, call clear down, hand-over and the like. Typically a GPS receiver is also connected to the portable computer so that this diagnostic information can be indexed by position and subsequently mapped.

FIG. 1b shows an example of the type of map 120 which can be generated using such a drive testing procedure. Geographical information such as road 134 is overlaid with results of individual measurements, such as measurements 136, and a desired and/or measured pattern of network cells, such as cells 122, 124, 126 and 128. Measurements 136 may be colour coded, for example to indicate signal strength. In the map of FIG. 1b region 132 indicates a hole in the network coverage where calls could be dropped. Region 130 indicates an area where overlapping coverage from two different cells operating at the same frequency could cause interference. Examples of drive testing systems are the TEMS (Test Mobile System) investigation system of Ericsson and the E-7478A GPRS drive test system of Agilent Technologies.

U.S. Pat. No. 6,266,514 (and related patent applications WO 00/28755 and WO 00/28756) describes a system for monitoring a cellular network without need for drive testing, by making use of data which can be collected from mobile phone users. Events such as a quality measurement dropping below a predetermined threshold are detected and the location of the mobile station at the time is then used to construct a map, thus automatically mapping areas of poor coverage. The mobile station position is determined by triangulation from at least three base stations. In a variant of the technique a GPS receiver is located in the mobile station and a mobile position report is transmitted to the base station as part of the network signalling (as a conventional IS136 RQL radio quality message), and thus does not interfere with the traffic.

In another system, described in WO 99/12228, a master automatically initiates calls to multiple automatic mobile responders dispersed within the coverage area of a wireless mobile phone network. This provides a real time indication of the network quality. In a preferred embodiment the responders are each equipped a GPS receiver which provides position, and optionally time and velocity information for the mobile responders. The responders are self-sufficient and may be placed in vehicles which are not dedicated to testing, such as postal or public transit vehicles. The matter is connected to a conventional fixed, land telephone line. The responders check network parameters, in particular audio quality (using 23-tone testing), and transmit the results back to the master mobile station 116 to via the mobile phone network and PSTN. The arrangement of this system simplifies testing in that the responders are essentially self-sufficient and automatic, thus facilitating the monitoring of a network performance over an extended area from a single master location.

The above prior art techniques seek to monitor a mobile phone network performance solely by making measurements at one or more mobile stations. Parameters relating to a user's perception of network performance, such as audio quality, the number of dropped calls and the like are measured but the detailed technical information which engineers setting up and optimising a phone network would ideally like to have access to are not available through such tests.

In a typical third generation CDMA mobile phone network there are some 700 parameters which may be adjusted to affect the performance of any given cell, and a further approximately 300 parameters associated with GPRS data transmission. As well as the problems of poor network coverage and interference from adjoining cells mentioned above, network operators also have complex heuristics for frequency planning and radio resource usage, to attempt to maximise traffic and/or revenue. These considerations are further complicated by variations in traffic load with time of day and other factors.

By only measuring at a mobile station the above described prior art techniques are not able to access details of the network functionality and in particular they are not able to determine the response of the network to an individual call.

The mobile station and network function in some respects as a single complex entity, affected by other mobile stations connected to the network and other traffic carried by the network. It is therefore desirable to be able to monitor the interaction of a mobile station with a network and to investigate how the network responds to attempts by the mobile station to drive traffic through the network in the context of other traffic being carried by the network. It is further desirable to be able to monitor such interactions dynamically since traffic on a digital mobile phone network is managed dynamically on a timescale of a few milliseconds.

GSM-type digital mobile phone networks include an Operation and Maintenance Centre (OMC) which collects statistics from network infrastructure elements such as base stations and switches and compiles these into a database. This provides network operators with a high level view of the network performance which can complement the data obtained by drive testing. Thus, for example, the OMC typically includes counters for every dropped call split out by cell, and time. Several companies, for example ADC Telecommunications of Minneapolis, USA provide systems for analysis of this OMC data. However because the OMC data is aggregated into statistics it cannot provide information relating to an individual mobile station. Data of this type such as the number of protocol errors of an individual mobile station, is only available at a lower level within the network.

In addition to OMC data, call trace and cell trace data is also sometimes available. This data essentially comprises a diagnostics log containing messaging, including air-interface messaging, relating to a single call or cell. These logs are produced by the base station controllers of some of vendor's equipment, and can be helpful in tracking down specific problems with a user or a type of handset.

A third source of data relating to the operation of a mobile phone network infrastructure is provided by protocol analysers. A protocol analyser comprises equipment to tap a link or interface between infrastructure elements (either logical or physical. Broadly speaking a protocol analyser simply records all the data flowing on such a link or across such an interface as "trace file". Such trace files can contain all the messaging between the two elements connected by the link being tapped, for example all the messaging between a base station controller and a switch. Protocol analysers are available from companies such as Tektronics, Agilent and Edixia of Telecom Technologies, France, Europe. One model "Océan" available from Edixia captures data on 300 E1 (2 Mbps) connections and provides this data over an SDH (Synchronous Digital Hierarchy) link, to allow it to be transferred over a high band width optical network to a data store.

Referring now to FIG. 2, this shows a generic structure 200 for a digital mobile phone network, showing the type of prior art tests which can be carried out.

A mobile station 202 is connected to a base station 204, serving the cell in which the mobile station is located, across an air interface Uu 216. The base station 204 is coupled to a base station controller 206 across interface Iub 218. The base station controller 206 is connected to a voice switch 208 via interface Iuc 220, and thence to a voice phone network 210. These elements correspond to the network elements shown in FIG. 1a. Successively higher nodes concentrate the traffic and omit unnecessary operational messaging, and functionality is generally delegated so that, for example hand-overs between base stations coupled to the same BSC are not seen by higher levels.

Mobile cellular communications systems such as GPRS (General Packet Radio Service) and 3G systems add packet data services to the circuit switched voice services. Thus base station controller 206 is also coupled to a packet switch 212 via Iup interface 222, and thence to a packet data network such as the Internet 214.

In FIG. 2 mobile station is shown connected to a laptop computer 224. This in turn is coupled to a GPS receiver 226 to allow user level drive testing, as shown schematically by box 228. Subscriber level protocol tracing 230 can be performed by capturing data from Iub interface 218 and area level protocol tracing can be performed by capturing data from interface Iu 220, interface Iup 222, and/or interfaces (not shown) within voice switch 208 or packet switch 212. At a higher level Call Detail Records (CDRs) and SS7 (Signalling System No. 7, an international standard used for the ISDN backbone) data 234 may also be collected from voice switch 208 or packet switch 212 for analysis. Vendor specific OMC data 236 provides network statistics as described above. Broadly speaking data collected from elements to the right of dashed line 238 is useful for diagnostic purposes whilst data collected from elements to the left of line 238 provides statistical information on how the network is performing but does not generally allow the reasons for a particular level of performance to be discerned.

FIG. 2 is representative of a range of digital mobile phone networks including so-called 2.5G networks such as GSM/GPRS and third generation mobile communications networks as encompassed by the International Mobile Telecommunications IMT-2000 standard (available from the International Telecommunications Union, ITU at www.itu.int and hereby incorporated by reference).

Unlike GSM, third generation technology uses CDMA (Code Division Multiple Access) rather than TDMA (Time Division Multiple Access) and the IMT-2000 standard encompasses three modes of operation, WCDMA (wideband CDMA) Direct Spread FDD (Frequency Division Duplex) in Europe and Japan, CDMA2000 multicarrier FDD for the USA and TD-CDMA (Time Division Duplex CDMA) for China.

Collectively the radio access portion of a 3G network (RNCs and node Bs) is referred to as UTRAN (Universal Terrestrial Radio Access Network) and a network comprising UTRAN access networks is known as a UMTS (Universal Mobile Telecommunications System) network.

The UMTS telecommunications systems are the subject of standards produced by the $3^{rd}$ Generation Partnership Project (3GPP), including Technical Specifications 23.101, 25.410, 25.420, 25.430 and 25.931, which are hereby incorporated by reference. The GSM standard and aspects of GPRS are defined in ETSI (European Technical Standard Institute) standards GSM 01 to 12, which are hereby incorporated by reference; details of the GPRS radio interface are described in particular in GSM 03.64 and GSM 04.60. Further aspects of the GPRS service are described in 3GPP Technical Specification 23.060 (version 4.1.0), which is also hereby incorporated by reference, and associated quality of service concepts are defined in 3G TS 23.107 (version 3.0.0) again hereby incorporated by reference.

In FIG. 2 the interfaces shown have different names depending upon the precise form of mobile phone network. The names of the interfaces in the different networks are shown in the following table.

| Type of Network | Interface | | | |
|---|---|---|---|---|
| | Iup 222 | Iuc 220 | Iub 218 | Uu 216 |
| GSM/GPRS | Gb | A | Abis | Um |
| cdma2000 | Iup | Iuc | Aquater | Uu |
| WCDMA | Iup | Iuc | Iub | Uu |

Referring now to FIG. 3a, this shows details of the base station controller 206 and packet switch 212 in a GSM (and/or UMTS) network supporting GPRS functionality.

The elements labelled in FIG. 2 as base station controller 206 and base station 204 make up a Base Station System (BSS) comprising a BSC (or RNC) 300 coupled via an Abis interface 308 to base station (or Node B) 204. The BSC (RNC) 300 is also coupled via an A interface 312 to voice switch 208, and via a PCU A disk interface 310 to a packet control unit (PCU) 302. The PCU 302 is in turn connected, via a Gb interface 314 to a Serving GPRS Support Node (SGSN) 304.

A plurality of SGSNs 304 are connected via a Gn interface 316 to a Gateway GPRS Support Node (GGSN) 306, which in turn is connected via a Gi interface 318 to Internet 214. The SGSNs 304 and GGSN 306 are connected together by means of an IP-based packet switched network, and together make up part of what is referred to as packet switch 212 in FIG. 2. The SGNS and GGSN functionalities (and the functionalities of other elements within the network) may reside on a single physical node or on separate physical nodes of the system. In a GPRS network security and access control functions and tracking the location of an individual mobile station are also performed by the SGSNs.

FIG. 3b shows user end equipment 320 for use with the mobile phone networks of FIGS. 2 and 3a. This equipment comprises a mobile station or handset 322, in the context of data services sometimes referred to as a mobile terminal (MT), incorporating a SIM (Subscriber Identity Module) card 324. Handset 322 is coupled to a personal computer 326, sometimes referred to as Terminal Equipment (TE), by means of a serial connection 328.

Once a handset has attached to a GPRS network it is effectively "always on" and user data can be transferred transparently or non transparently between the handset and an external data network. Personal computer 326 communicates with handset 322 using standard AT commands as defined, for example, in 3GPP Technical Specification 27.007, hereby incorporated by reference. Handset 322 may require a terminal adaptor, such as a GSM datacard (not shown) in FIG. 3b.

User data is transferred transparently between handset 322 and an external IP network such as Internet 214 by means encapsulation and tunnelling. Where a reliable data link is not required, UDP (User Datagram Protocol, as defined in RFC 768) may be used instead of tunnelling. A packet Temporary Mobile Subscriber Identity (Packet TMSI) is allocated to each GPRS-attached handset and a packet domain subscriber identified by an International Mobile Subscriber Identity (IMSI) is allocated a Packet Data Protocol (PDP) address, which is an IP address specifying a GGSN node to access, so that data from a mobile subscriber can be "tunnelled" to the handset's point of attachment to the network. Radio interface resources are shared dynamically between speech and data as a function of service load and operator preference, as described in more detail below. The GPRS specification separates the radio sub-system from the rest of the network to allow the radio access technology to be changed or upgraded.

It will be appreciated that in a network of the general type shown in FIG. 2, as well voice and/or data traffic each interface carries signalling comprising control messages for managing the network. These messages fall into one of three broad categories, call control signalling, mobility management signalling, and radio resource signalling, although the information available from this signalling depends upon the interface concerned. For example at Abis interface 308 and PCU Abis interface 310 information is available relating to the relative allocation of radio resources to voice and data traffic, but such detailed radio resource signalling is not available at higher levels within the network.

Referring now to FIG. 4a, this shows a system 400 for capturing and analysing data from Abis interface 308 using a protocol analyser. The same principles apply to capturing data at other interfaces within the network.

A plurality of E1 (2.048 Mbps) or T1 (1.544 Mbps) connections 402-410 connect base station controller 300 to base station 204, one E1/T1 data feed being allocated to each base station transceiver. Each of these data feeds is coupled to protocol analyser 414, which writes the captured data into a plurality of data files 416a-c at, for example 15 minute, intervals. These data files may be physically located within the protocol analyser 414 or at some separate, remote location. In a subsequent step a data analyser 418 reads the data in data files 416 and analyses the data for diagnostic purposes. In variants of the technique the captured data is made available on a computer network rather than written to files.

Each 2 Mbps E1 data feed comprises 32 time domain multiplexed 64 Kbps PCM channels, each PCM channel comprising two logical traffic channels and two logical control channels, one each way per call. Data from an E1 data feed is captured and streamed into the data file by protocol analyser 414. Data analyser 418 then implements the appropriate protocol stack for the interface from which the data has been captured in order to convert the data to a useful form. Data analyser 418 may be configured to associate traffic data with signalling data for a single voice call so that the progress of the call, cell-to-cell hand-overs and the like can be monitored. At a low level such as Abis interface 308 information such as RF signal level measurement reports are available whereas data collected at a higher level interface such as the Iup or Gb interface 314 omits such detailed operational signalling. Likewise at the Iub/Abis interface data is available for all subscribers attached to base station 204 but at higher level interfaces such as Iup/Gb data for a larger number of subscribers is available.

Actix Limited of London, UK has a commercial product, CallTracker (trade mark) which can be used to analyse data collected by a protocol analyser in this way. The Actix CallTracker works by monitoring Abis messages from multiple transceivers belonging to a number of cells. Each transceiver can handle multiple simultaneous calls. In order to track every call, the CallTracker analyses all the Abis messages for call initiation sequences, that is call set-ups, and remembers the timeslot information assigned to each new call. If a timeslot assigned to a call is to be changed, for example, at a handover, then the CallTracker interprets the contents of the resulting Abis command sequence in the existing timeslot and uses them to link to the new timeslot that matches the signalling information. The CallTracker then tracks the sequence of messages from the old timeslot and the new timeslot to determine whether the handover is successful or not and updates its internal records accordingly. This process repeats until the call terminates, and in this way the CallTracker is able to determine the timeslot information for each call and hence is able to associate each Abis message with a particular call.

By using a GPS receiver coupled to a personal computer a set of timed position measurements for a mobile station can be logged in a data file. The CallTracker software is able to combine this position information with data from the protocol analyser in order to generate a map showing the position dependence of call-related parameters. However there remains a need for still more detailed information, in particular relating to the dynamic behaviour of the network, especially where the transmission of packet switched data is concerned. This can be illustrated by considering the allocation of radio resources in a GSM-based GPRS packet data transmission network.

In a GSM-type network 124 carrier frequencies are used each carrying TDMA (Time Divsion Multiple Access) data. This TDMA data is arranged in burst periods of 156.25 bits each lasting 0.577 ms, eight burst periods constituting a TDMA frame (which lasts approximately 4.6 ms). One physical channel comprises one burst period per TDMA frame, so that each frame carries 8 channels. Some channels are used to carry traffic, such as voice and data traffic, and other channels are used for signalling or control messages, such as the broadcast control channel, the paging channel used to alert the mobile station to an incoming call, and other channels. A group of 26 frames defines a multiframe in which 24 frames are allocated to traffic channels, one frame is allocated to signalling, and one frame is unused.

FIG. 4b shows four TDMA frames 422, 424, 426 and 428 at successive time intervals, each frame comprising 8 timeslots a to h, during each of which data can either be transmitted or received. In FIG. 4b a time slot occupied by data traffic is indicated by "D", a time slot occupied by speech traffic is indicated by "X", and an unused time slot is left blank. In GSM-GPRS rules govern which slots may be occupied by data, these rules specifying that for a given upstream/downstream transmit/receive data stream the slots must be contiguous and must not cross the middle point of a frame. Speech data is given priority and when a call initially set up speech may occupy any time slot, although the network may then contrive to shuffle the time slot occupied by a speech connection to create a desired number of data timeslots. Typically a greater data bandwidth is needed for downstream data than for upstream data. In the example shown in FIG. 4b initially in frame 422 three timeslots, 422a-c are occupied by downstream data and one timeslot, 422f is occupied by upstream data. Then, in frame 424, two voice calls occupy timeslots 424a and 424c thus leaving only one downstream timeslot for data, timeslot 424b. In frame 426 the call previously occupying timeslot 424a has been moved to 426h, freeing up two contiguous timeslots for downstream data. Finally in frame 428 the speech channel occupying timeslot 426c has been reallocated to timeslot 428d to once again achieve three contiguous timeslots available for downstream data, timeslots 428a-c.

It will be appreciated that to properly understand the behaviour of a network it is desirable, for example, to be able to monitor how individual timeslots are being allocated to data channels, in response to both the demands made by an individual mobile station and the load imposed on the network by other traffic in the same or nearby cells. A packet data transmission has an associated quality of service (QoS) profile which is negotiated with the network in accordance with the available GPRS resources. The network always attempts to provide adequate resources to support the negotiated quality of service and the data transmission radio priority is determined based upon this. The quality of service is also classified depending upon whether the traffic is delay sensitive (for example video) or relatively delay insensitive (for example, web browsing). Generally quality requirements such as delay and reliability only apply to incoming traffic up to a guaranteed bit rate.

It will be understood from the foregoing discussion that an important problem arising in the context of 2.5G and 3G mobile phone networks is presented by the need to be able to analyse the dynamic behaviour of the phone network as the network is being exercised. In a circuit switched network, once a circuit has been established it is relatively straightforward to test the characteristics of the channel by making measurements at one end, such as the measurements described above with reference to drive testing. Likewise in a circuit switched network data parameters such as round trip delay are meaningful and useful information regarding data throughput and delay can be obtained simply by making measurements at the mobile station end.

By contrast in a packet switched network different packets may take different routes to their destination, and may be delayed or even lost entirely, depending upon other traffic within the network. Moreover, because the circuit switched voice connections take priority at the radio interface, and because radio channels may be occupied or become free according to whether or when other users in the cell place voice calls, meaningful data about the network performance must take into account not only what is taking place at the mobile station end, but must also take account of what is taking place at other points within the network. In a further complication the priority given to data traffic depends upon the negotiated quality of service and upon the class of traffic being sent or received. There are additional complicating factors imposed by the network operators, such as data rate limitations placed on users trying to send or receive large volumes of data (to stop low rate traffic being denied access) which means that packets are not necessarily allocated slots on a random basis.

There is therefore a need for improved systems and methods for testing and monitoring digital mobile phone networks, and in particular 2.5G and 3G networks configured for the transmission of packet data.

SUMMARY OF THE INVENTION

According to a first aspect of the present invention there is therefore provided a method of providing performance information for a digital mobile communications network, the network comprising: a communications network infrastructure, the infrastructure having a plurality of elements, including a plurality of radio communications base stations, and having interfaces between said elements; and a plurality of mobile communications devices for radio communications with said base stations; communications between a said mobile communications devices and said base stations, and signals on interfaces within the network infrastructure, comprising traffic and signalling data; the method comprising: collecting data on at least one parameter associated with a first data communications session of a said data communications device to provide measurement data; establishing a second data communications session for said mobile communications device; sending said measurement data from said mobile communications device into said communications network infrastructure using said second data communications session; reading at least signalling data for said first data communications session from a first of said network infrastructure interfaces; reading said measurement data from a second of said network infrastructure interfaces; correlating said signalling data for said first data communications session and said measurement data; and outputting a result of said correlating to provide said performance information.

The technique allows the performance of a mobile device sending or receiving real subscriber traffic to be correlated with information relating to the operation of a network. Depending upon the interface or interfaces from which data are read (and it will be recognised these are defined signal interfaces rather than necessarily physical interfaces) this network operation data or signalling data may comprise relatively low level data such as radio resource allocation data or higher level data relating to the operation of the network and resources allocated to a subscriber or data communications session. The signalling data and the measurement data may be retrieved from different interfaces, although generally it is more convenient for both of the signalling and measurement data to be retrieved from the same interface, since this allows signalling data and measurement data such as service type (e-mail, web browsing, and the like) or statistical data (such as throughput or bit error rate) to be captured from a single tap into the network, which simplifies data capture as well as correlating data for later analysis. Alternatively information from different interfaces may be captured and correlated. Here "signalling data" is used broadly to include protocol data, control information and other traffic-associated data on the interface or link.

Similarly the signalling and measurement data need not be read at the same time. In many cases the measurement data, for example where it relates to statistical information gathered over a number of data communications sessions or over a period of time, may be read at a different time to the signalling data, the correlation being performed afterwards. In other embodiments of the method a mobile communications device may have more than one data communication session open at one time (in a conventional, Internet protocol, IP-type manner) so that the measurement data may be sent at the same time as the real traffic is sent or received. This has the advantage of facilitating near real-time performance monitoring which is useful for network operators.

With these methods it will be appreciated that two sets of data (signalling and measurement data), from different sources but both relating to the same mobile device, are being captured and correlated to provide information on the network's performance. Furthermore, network performance can be monitored in this way from within the network and there is no need, for example, to restrict performance monitoring to a single location such as the location of a server with which, say, the mobile device communicates. Embodiments of the method may read just relevant signalling information or, if desired, a portion or all of the real traffic to which the measurement data relates can be captured for later analysis.

"Measurement data" is used broadly to refer to any determined property or data characteristic of the traffic which might be useful in correlation with signalling data for the traffic, for example for monitoring or analysis of the allocation of network resources to a data session. Thus measurement data includes labels such as service type, and information such as an access point name or number. In 2.5G and 3G networks data is transferred in packets and information relating to a packet transfer can be determined by tapping an interface such as, for example, the PCU Abis (or Iub) interface, but by itself this information is relatively uninformative. For example if, say, three data packets are seen and then no more for an interval for one data communications session, this may be normal performance (for retrieving an e-mail or browsing a web page in which all the web page data is contained within those three packets), but for another, for example if the service type is a video stream, then it may be unlikely that the network is operating satisfactorily for the user/session. The measurement data may, therefore, provide an indication of service type to allow a simple evaluation of performance. Other examples of measurement data are described later, but as well category-type data, data such as statistical data (for example bit error rate or throughput), which will often be available in the mobile device, may also be included.

The measurement data may be provided by a software "agent" in the mobile device. Such an agent may be installed on manufacture, for example by the handset manufacturer or on behalf of a network operator, or may be downloaded from a network operator or a trusted third party. This software agent may provide general monitoring services or may monitor the performance of a specific service with which it is associated, such as an online banking service or a video streaming service or an e-mail or other data service. This agent may send back data to one or more Internet-based servers but, from the point of view of embodiments of the above method, the final destination of the data does not matter provided that the data can be tapped at an accessible interface within the network infrastructure. It will be appreciated that this is a useful advantage.

The signalling and/or measurement data may either be identified on the interface (s) so that the desired data is captured or data for a plurality of sessions/devices may be captured at an interface and the relevant data extracted afterwards. As mentioned above, the Actix CallTracker (Trade Mark) is able to follow a communication thread; a relevant thread may be identified, for example, by means of a mobile device for subscriber or other identifier (such as an IMSI), for example read from a third interface and linked to a lower level identifier for use at the first and/or second interface. The measurement data may conveniently be identified by incorporating within it a characteristic data pattern, for example at the start of each packet. This significantly facilitates identifying relevant data on a very high speed link since it is straightforward to look at the relevant position in each data packet or in a selection of data packets to determine whether or not a packet should be captured. This technique allows very high speed screening, which addresses the problem of handling very large volumes of very high speed data present on some interfaces within digital mobile phone networks. It may than also, in some instances, be possible to then identify the relevant signalling data for the mobile device based upon an identified measurement data stream from the device.

In a related aspect the invention therefore provided a software agent for providing performance information for a digital mobile communications network, the network comprising: a communications network infrastructure, the infrastructure having a plurality of elements, including a plurality of radio communications base stations, and having interfaces between said elements; and a plurality of mobile communications devices for radio communications with said base stations; communications between a said mobile communications devices and said base stations, and signals on interfaces within the network infrastructure, comprising traffic and signalling data; the software agent being configured for operation within a said mobile communications device and comprising code for controlling the device to: collect data on at least one parameter associated with a first data communications session of a said data communications device to provide measurement data; establish a second data communications session for said mobile communications device; combine a characteristic pattern with said measurement data; send said measurement data with said characteristic pattern from said mobile communications device into said communications network infrastructure using said second data communications session; whereby said measurement data is identifiable and retrievable at a said network infrastructure interface.

In another aspect the invention provides performance monitoring code for providing performance information for a digital mobile communications network, the network comprising: a communications network infrastructure, the infrastructure having a plurality of elements, including a plurality of radio communications base stations, and having interfaces between said elements; and a plurality of mobile communications devices for radio communications with said base stations; communications between a said mobile communications devices and said base stations, and signals on interfaces within the network infrastructure, comprising traffic and signalling data; the code comprising code to: input at least signalling data for a first data communications session of a said mobile communications device from a first of said network infrastructure interfaces; input measurement data from a second data communications session of said mobile communications device from a second of said network infrastructure interfaces; correlate said signaling data for said first data communications session and said measurement data; and output a result of said correlating to provide said performance information.

The invention also provides performance monitoring apparatus for providing performance information for a digital mobile communications network, the network comprising: a communications network infrastructure, the infrastructure having a plurality of elements, including a plurality of radio communications base stations, and having interfaces between said elements; and a plurality of mobile communications devices for radio communications with said base stations; communications between a said mobile communications devices and said base stations, and signals on interfaces within the network infrastructure, comprising traffic and signalling data, the apparatus comprising: means to input at least signalling data for a first data communications session of a said mobile communications device from a first of said network infrastructure interfaces; means to input measurement data from a second data communications session of said mobile communications device from a second of said network infrastructure interfaces; means to correlate said signaling data for said first data communications session and said measurement data; and means to output a result of said correlating to provide said performance information.

In a preferred embodiment the code includes code to categorise the measurement data for analysis, for example to allow this data to be split out by "dimension" or category such as service type, device type, protocol type, access port number, device-roamed (or not), and the like. Data may also be aggregated, for example to aggregate data relating to two simultaneous, monitored data communications sessions of a mobile device. Data, particularly statistical data, may also be aggregated over a period of time, such as a day, and/or then separated, for example by service type. The results of such analysis may be stored, for example in a database, and/or provided as an output, advantageously as a graphical output.

According to a further aspect of the present invention there is provided a method of testing a digital mobile phone network, the network comprising, a communications network infrastructure, the infrastructure having a plurality of elements, including a plurality of radio communications base stations, and having interfaces between said elements; and a plurality of mobile communications devices for radio communications with said base stations, communications between a said mobile communications devices and said base stations, and signals on interfaces within the network infrastructure, comprising traffic and signalling data; the method comprising: creating test traffic between a test one of said mobile communications devices and said communications network infrastructure, measuring at least one parameter associated with said traffic to provide measurement data, coding said measurement data representing said measured parameter into said test traffic, demultiplexing traffic and associated signalling data for said test mobile communications device from traffic and signalling data for others of said mobile communications devices on a test interface selected from said infrastructure element interfaces, decoding said measurement data from said demultiplexed traffic for said test mobile communications device; and combining said decoded measurement data and said demultiplexed signalling data for said test mobile communications device to determine a response of said digital mobile phone network to said test traffic.

By driving test traffic over the network and then measuring the performance of the network in response to the created traffic and inserting this measurement data into the traffic stream itself, a traffic and signalling thread is created within the network which can be tapped to retrieve not only the signalling information for a given test voice or data call but also information about the performance of the network in response to the test traffic as seen from the mobile subscriber end. The type of test and/or parameters characterising the test traffic driven onto the network can also be determined because the type of test being run will be known or because in embodiments of the method, parameter characterising the test are encoded within the test traffic.

The method may involve pulling or pushing test voice or data traffic to or from the test mobile communications device. Since the test device is creating the traffic, when the traffic and signalling data is monitored within the network subscriber-end measured parameters can be linked with network behaviour. Thus the effect of the allocation of radio resources as illustrated in FIG. 4b or, at a higher level, the loss of packets due to a buffer overflow, can be seen.

Important parameters which can be measured for data traffic include data throughput and data delay. Although round trip delay can be measured from a mobile station with a "ping" test this is not a reliable indicator of one-way throughput or delay, and is also unrepresentative of typical traffic because of the very small data payload such a function requires. By contrast the present method allows a realistic test of, for example, web page download, video streaming or an FTP session or, at a lower level, TCP or UDP data transmission protocols.

The method allows information about the data being used to exercise the network and about the bit rate and time delay as seen from the subscriber end to be collected from traffic within the network, concurrently with network control signals. The method allows this information to be collected from any point within the network at which traffic and signalling information relating to the test mobile communications device is available. At a low level such as the Abis allocation of radio resources can be tied to data throughput and delay whilst at a higher level such as the Gb interface other parameters such as bandwidth allocation can be monitored.

The method can be used with either voice or data test traffic but is particularly useful for testing the response of the network to a demand for packet data transmission. This is because with a circuit switched voice call a radio time slot is always allocated to the circuit whereas with a data call the allocation of time slots depends upon demand.

A variant of the method may be used with 'real' subscriber traffic and the measurement data may then comprise data indicating the type of traffic (eg. service type such as HTTP, email, video) and/or statistical information such as throughput, bit error rate and the like.

With a 3G CDMA network users other than the test device effectively constitute interference to communications of the mobile test device with the network. Rather than monitoring the allocation of timeslots the radio performance and characteristics of a cell may be determined using the method, but the same general principles apply. In a CDMA system users other than the test mobile communications device effectively add background noise and CDMA systems therefore attempt to limit the number of users of a given cell to maintain signal quality.

The signal quality thresholds for voice and data will in general be different and the tolerable signal to noise ratio generally depends upon the class of data traffic and the use to which the data is being put. For example when downloading a large file, although a relatively slow throughput and long latency may be tolerable as compared with, for example, video streaming, a packet failure rate of 1 in 100 may be adequate but a packet failure rate of 1 in 2 with retry-on-failure may prevent a large file from ever being downloaded. The present method allows a 3G network to be tested by, for example, downloading a large file and then allows the systems performance to be monitored at different levels within the network. In particular it allows the dynamic performance of the network, as measured at the test mobile communications device, to be associated with the signalling to control the test traffic taking place at the same time. All these can be done within different parts of the network.

It will be appreciated that the test interface may comprise any interface within the digital mobile phone network at which traffic and associated signalling data is available, and is not restricted to an interface defined by a formal specification for the network. It will likewise be appreciated that the test interface may be either a logical or a physical interface. The signalling data may comprise call control, mobility management, or radio resource signalling data or other network signalling or control data.

In a preferred embodiment the at least one measured parameter is a parameter of traffic received at the test mobile communications device in response to test traffic transmitted from that device, although in other embodiments one or more parameters of test traffic sent from another mobile communications device may be measured. Preferably the measurement is performed on traffic received from the test mobile communications device by, for example, a terminal connected to the device, rather than on raw data extracted at a low level from within the mobile communications device.

The measurement data may comprise data characterising traffic rate, traffic signal to noise ratio or bit error ratio, and traffic delay or latency; other data such as position data (derived, for example, from a GPS receiver) may also be inserted into the traffic. Preferably the demultiplexing extracts a traffic and signalling thread for the test mobile communications device from other traffic and signalling data within the network, although in other embodiments the traffic and signalling data for the test device may simply be labelled to allow it to be identified for subsequent decoding. Similarly the decoding, in the case of data test traffic, may also simply comprise labelling the relevant data items. Once demultiplexed and decoded the measurement data and signalling data are combined or associated in such a way that the data can be read together, to assist in interpreting the behaviour of the network in response to the test traffic. Thus, again, the combining may simply comprise labelling corresponding data items to allow decoded measurement data and corresponding demultiplexed signalling data for the test device to be identified.

The method may be used with any digital mobile phone network including, but not limited to, a GSM/GPRS mobile phone network (and related networks such as PCS-1800 and PCS-1900 networks), cdmaOne and cdma2000 networks, IS136 (digital amps), iDEN (integrated Digital Enhanced Network) and TETRA, and WCDMA 3G networks.

The test traffic may be created by either pulling or pushing data to or from the test device, for example by requesting data from an external packet data network address or from another mobile communications device. A transparent data transmission protocol such as TCP (Transmission Control Protocol) or a non-transparent protocol such as UDP (User Datagram Protocol) may be employed. Where data communications are "always on" establishing a data communications session (in GPRS, a Packet Data Protocol Context Request) may comprise requesting or negotiating a desired quality of service. Measurements may then include quality of service-related parameters such as latency—the time it takes for a packet to cross a network connection from a sender to a receiver. The measurements may comprise, for example, time measurements, data throughput (for example, maximum, minimum or average bit rate) and bit error ratio (residual or other BER). Measurements may also be made on packets or service data units (SDUs) to determine, for example, SDU loss probability, SDU error probability, SDU transfer delay, and SDU transfer rate. In the case of a voice mode connection audio parameters such as signal to noise ratio may be measured and the measurements encoded as, for example, audio tones.

The method may further comprise inserting test characterising data representative of the type of test traffic into the test traffic, and then decoding this test characterising data and combining the decoded data with the decoded measurement data and the demultiplexed signalling data. The test characterising data may comprise one or more of traffic type data (voice or data), traffic class such as conversational (where time relation preservation and a low delivery delay time are important), streaming (for example video streaming, where the time relationship or sequence of packets is important but the delivery time is less important), interactive (for example web browsing, where the request-response pattern and data content are important but not the time relation between individual packets) and background (for example e-mail download, where timing is of little importance but the data content must be preserved). Other test characterising data may comprise, for example file size data, the address of the IP network with which communication is taking place, and time of day, week or month data. More precise time data, for example derived from the network itself or from a GPS receiver, may be included with the measurement data and may include timing data with a precision of better than 100 ms or in some circumstances better than 1 ms.

In a preferred embodiment the test mobile communications device comprises an unmodified consumer mobile communications device. This allows the network to be tested and its performance evaluated by simulating a subscriber to the network and by measuring the response of the network to the test traffic under realistic conditions simulating actual use of network.

Preferably the traffic and signalling demultiplexing comprises recording substantially all the traffic and signalling data at a point within the network and then demultiplexing or dethreading this recorded data to extract a single thread comprising traffic data and associated signalling data for the test mobile communications device. Preferably this demultiplexed traffic and signalling data is decoded according to a protocol stack associated with the point at which the information was collected, that is, the relevant protocol stack is implemented in reverse to decode the captured and demultiplexed traffic and signalling data. For this reason the method is preferably applied (but need not exclusively be applied) at an interface or reference point at which signals within the network are defined according to an agreed standard for the network.

Preferably the decoded measurement data and demultiplexed signalling data are stored in a time series database so that the measurement data and corresponding signalling data are retrievable as a time series for ease of interpretation and graphical presentation. Where the test traffic comprises packet data traffic, in a preferred embodiment the method further comprises outputting a graphical representation of the combined data to provide representation of radio interface resources and the at least one measured parameter over time. Preferably the radio interface resources are graphically displayed, for example as a bar chart, to show what fraction of the resources are devoted to data traffic and what fraction are devoted to voice traffic. In other embodiments, however, the graphical representation may simply indicate a variation in the radio resources allocated to data over time. A particularly preferred embodiment displays data throughput and/or delay parameters over time in association with the radio resources to allow a side by side comparison of network function and a measure of perceived subscriber quality of service.

In another aspect the invention provides mobile communications equipment for connecting to a mobile communications device for testing a digital mobile phone network, said mobile communications equipment comprising a mobile communications device driver having a traffic input for driving traffic to said mobile communications device and a traffic output for outputting a traffic received from said mobile communications device; a test traffic supply to supply test traffic; a traffic parameter measurer configured to receive an input from said device driver traffic output and to provide traffic parameter measurement data representing a measured traffic parameter; and a combiner configured to combine said test traffic from said test traffic supply and measurement data from said traffic parameter measurer and to provide a combined traffic output to said traffic input of said device driver; whereby, in operation, the equipment outputs traffic data comprising a combination of test traffic for testing said digital mobile phone network and traffic parameter measurement data to said mobile communications device, said traffic parameter measurement data representing a measured parameter of traffic received from said digital mobile phone network via said mobile communications device as a response to said test traffic.

The mobile communications equipment can be used with the above described method for testing a digital mobile phone network and provides corresponding advantages and benefits. In a preferred embodiment the mobile communications equipment comprises a suitably programmed general purpose computer having a serial or other port for connecting the computer to a test mobile communications device. Thus the mobile communications device driver, test traffic supply, traffic parameter measurer, and combiner preferably each comprise a portion of a programme code for controlling the computer to provide the required function. Similarly the traffic input and output of elements such as the device driver may comprise, for example, registers or memory areas.

In a preferred embodiment the combiner interleaves the measurement data with the test traffic to form a single output traffic stream. The test traffic may be generated randomly or loaded from a data store, and is preferably packetised for presentation to the device driver. The equipment is preferably controlled by a test sequence controller, in a preferred embodiment comprising a state machine. Where voice rather than data test traffic is employed test samples may be stored as, for example, "wave" files and the measurement encoded as (digitised) audio tones.

Preferably the device driver is suitable for driving an unmodified consumer mobile communications device. In this way the equipment can be arranged to simulate a subscriber to the digital mobile phone network, preferably using realistic test traffic and the performance of a network under these conditions can be evaluated.

The invention also provides computer readable programme code to, when running, implement the functions of the above described mobile communications equipment.

The invention also provides a carrier medium carrying computer readable code for controlling a computer coupled to a mobile communications device to test a digital mobile phone network, the code comprising computer code for, a mobile communications device driver having a traffic input for driving traffic to said mobile communications device and a traffic output for outputting a traffic received from said mobile communications device, a test traffic supply to supply test traffic, a traffic parameter measurer configured to receive an input from said device driver traffic output and to provide traffic parameter measurement data representing a measured traffic parameter and a combiner configured to combine said test traffic from said test traffic supply and measurement data from said traffic parameter measurer and to provide a combined traffic output to said traffic input of said device driver, whereby, in operation, the computer outputs traffic data comprising a combination of test traffic for testing said digital mobile phone network and traffic parameter measurement data to said mobile communications device, said traffic parameter measurement data representing a measured parameter of traffic received from said digital mobile phone network via said mobile communication device; as a response to said test traffic.

The carrier medium may comprise a data carrier or storage medium such as a hard or floppy disk, ROM or CD-ROM, or an optical or electrical signal carrier.

In another aspect the invention provides a method of using a mobile communications device to facilitate testing of a digital mobile phone network, the method comprising, controlling said mobile communications device to send test traffic over said digital mobile phone network, receiving traffic from said digital mobile phone network using said mobile communications device, measuring at least one parameter associated with said received traffic to provide traffic parameter measurement data; and inserting said traffic parameter measurement data into said test traffic, to thereby facilitate testing of said digital mobile phone network.

Preferably the method further comprises providing stored or random test traffic data from a test traffic data supply, coding this test traffic for transmission, coding the measurement data and interleaving the coded test traffic and measurement data, and providing this interleaved data to the mobile communications device driver.

The invention also provides computer readable programme code to, when running, implement this method. In a related aspect the invention provides test equipment for testing a digital mobile phone network, the network comprising, a communications network infrastructure, the infrastructure having a plurality of elements, including a plurality of radio communications base stations, and having interfaces between said elements; and a plurality of mobile communications devices for radio communications with said base stations, communications between a said mobile communications devices and said base stations, and signals on interfaces within the network infrastructure, comprising traffic and signalling data; the test equipment comprising, an input to receive data collected at a test one of said interfaces, said received data comprising traffic and signalling data for mobile communications devices using said network, a demultiplexer to identify test traffic and associated signalling data for a test one of said mobile communications devices from said received data, a decoder to identify measurement data representing at least one measured parameter associated with said test traffic embedded in said test traffic, and a data store to store at least said test traffic signalling data in association with said measurement data in such a way that time series measurement data and corresponding signalling data are retrievable from the data store.

This test equipment can be used for implementing the above described method of testing a digital mobile phone network, and provides corresponding advantage and benefits.

Preferably data is collected from the test interface using a protocol analyser or similar equipment and is stored in a data store. The test equipment input may then comprise a computer network connection to the data store, although in other embodiments data may be transferred from the protocol analyser data store to the test equipment on disk.

In a preferred embodiment the test equipment comprises a suitably programmed general purpose computer and the demultiplexer, decoder and data store comprise portions of programme code. Preferably the demultiplexer and decoder separate or extract the desired data from the remainder of the data, but in other embodiments the data of interest may simply be suitably labelled. The data store preferably comprises a time series data base, and preferably the equipment includes an output device to output a graphical representation of time series measurement data and corresponding signalling data.

The invention also provides computer readable programme code to, when running, implement the functions of the above described test equipment.

The invention further provides a carrier medium carrying computer readable code for controlling a computer to test a digital mobile phone network, the network comprising, a communications network infrastructure, the infrastructure having a plurality of elements, including a plurality of radio communications base stations, and having interfaces between said elements, and a plurality of mobile communications devices for radio communications with said base stations, communications between a said mobile communications devices and said base stations, and signals on interfaces within the network infrastructure, comprising traffic and signalling data, the code comprising computer code for providing, an input to receive data collected at a test one of said interfaces, said received data comprising traffic and signalling data for mobile communications devices using said network, a demultiplexer to identify test traffic and associated signalling data for a test one of said mobile communications devices from said received data, a decoder to identify measurement data representing at least one measured parameter associated with said test traffic embedded in said test traffic; and a data store to store at least said test traffic signalling data in association with said measurement data in such a way that time series measurement data and corresponding signalling data are retrievable from the data store.

The carrier medium may comprise any conventional data carrier or storage medium or an optical or electrical signal carrier.

In a corresponding aspect the invention provides a method of processing data from a digital mobile phone network to facilitate testing of the network, the network comprising, a communications network infrastructure, the infrastructure having a plurality of elements, including a plurality of radio communications base stations, and having interfaces between said elements; and a plurality of mobile communications devices for radio communications with said base stations, communications between a said mobile communications devices and said base stations, and signals on interfaces within the network infrastructure, comprising traffic and signalling data, the method comprising, inputting data from a test one of said interfaces, said inputted data comprising traffic and signalling data for mobile communications devices of said plurality of mobile communications devices, demultiplexing said inputted data to identify test traffic and associated signalling data for a test one of said mobile communications devices, identifying measurement data representing at least one measured parameter associated with said test traffic embedded in said test traffic; and storing said test traffic signalling data in association with said measurement data so as to be able to retrieve a time series of measurement data and the corresponding test traffic signalling data.

The invention also provides a system for testing a digital mobile phone network comprising a combination of the mobile communications equipment for connecting to a mobile communications device for testing a digital mobile phone network and the above described test equipment for testing a digital mobile phone network.

In a further aspect the invention provides a carrier medium carrying computer readable code for testing the performance of a mobile communications system as perceived by a subscriber to the system using a subscriber mobile communications device, the computer readable code comprising code for running on a computer system coupled to said subscriber mobile communications device, said code being for controlling the computer system to, send traffic over said mobile communications system using said subscriber mobile communications device, said traffic including test traffic and coded information; and to code said coded information to allow said information to be identified within said traffic and extracted from said traffic; and wherein said information comprises information relating to a test activity performed by said computer system.

In another aspect the invention provides a carrier medium carrying computer readable code for analysing the performance of a mobile packet data communications system, the mobile packet data communications system including a plurality of base stations for radio communication with a plurality of mobile communications system devices, the system being logically divided into portions linked at interfaces at which measurements may be made; the computer readable code comprising code to, when running, analyse data captured at a said interface, said code being configured to control a computer system to, read data captured at a said interface, extract traffic data and associated mobile communications system operation information for one of said communications devices from said read data, decode coded information from said traffic data, and output a linked combination of said decoded information and said mobile communications system operation information associated with said traffic from which said information was decoded.

The decoded information and system operation may be linked by time, for example entries being made in a database at regular intervals, each entry having a defined time, or in some other way, for example as linked lists. The functional requirement is that the decoded information can be linked to the system operation information associated with or corresponding to the traffic from which the information was decoded. This permits the two sets of data to be matched for example at times which correspond to within a predetermined degree of accuracy.

Preferably the code is further configured to control the computer system to provide a graphical representation of the decoded information and the mobile communications system operation information associated with the traffic from which the information was decoded.

In a further aspect the invention provides a method of testing the performance of a mobile communications system as perceived by a subscriber to the system using a subscriber mobile communications device, the mobile communications system including a plurality of base stations for radio communication with a plurality of mobile communications system devices, the system being logically divided into portions linked at interfaces at which measurements may be made; the method comprising: sending traffic over said mobile communications system using said subscriber mobile communications device, said traffic including test traffic and coded information, said coded information being coded to allow said information to be identified within said traffic and extracted from said traffic, said information comprising information relating to a test activity performed by said computer system; capturing data at a said interface; extracting traffic data and associated mobile communications system operation information for one of said communications devices from said captured data; decoding said coded information from said traffic data; and outputting a linked combination of said decoded information and said mobile communications system operation information associated with said traffic from which said information was decoded. Preferably the method includes outputting a graphic representation of both the decoded information and the system operation information associated with the traffic from which the information was decoded.

The invention may be embodied in computer programme code provided to a computer by a carrier medium such as a disk or a signal carrier of a communications network such as the Internet. As is well know to those skilled in the art, such programme code may be implemented on a single computer or in a client-server system on one or more computers. The computer programme code may be implemented as a single programme or as a number of separate applications.

BRIEF DESCRIPTION OF THE DRAWINGS

These and other aspects of the present invention will now be further described, by way of example only, with reference to the accompanying figures in which.

DETAILED DESCRIPTION OF PREFERRED EMBODIMENTS

Figure 5:
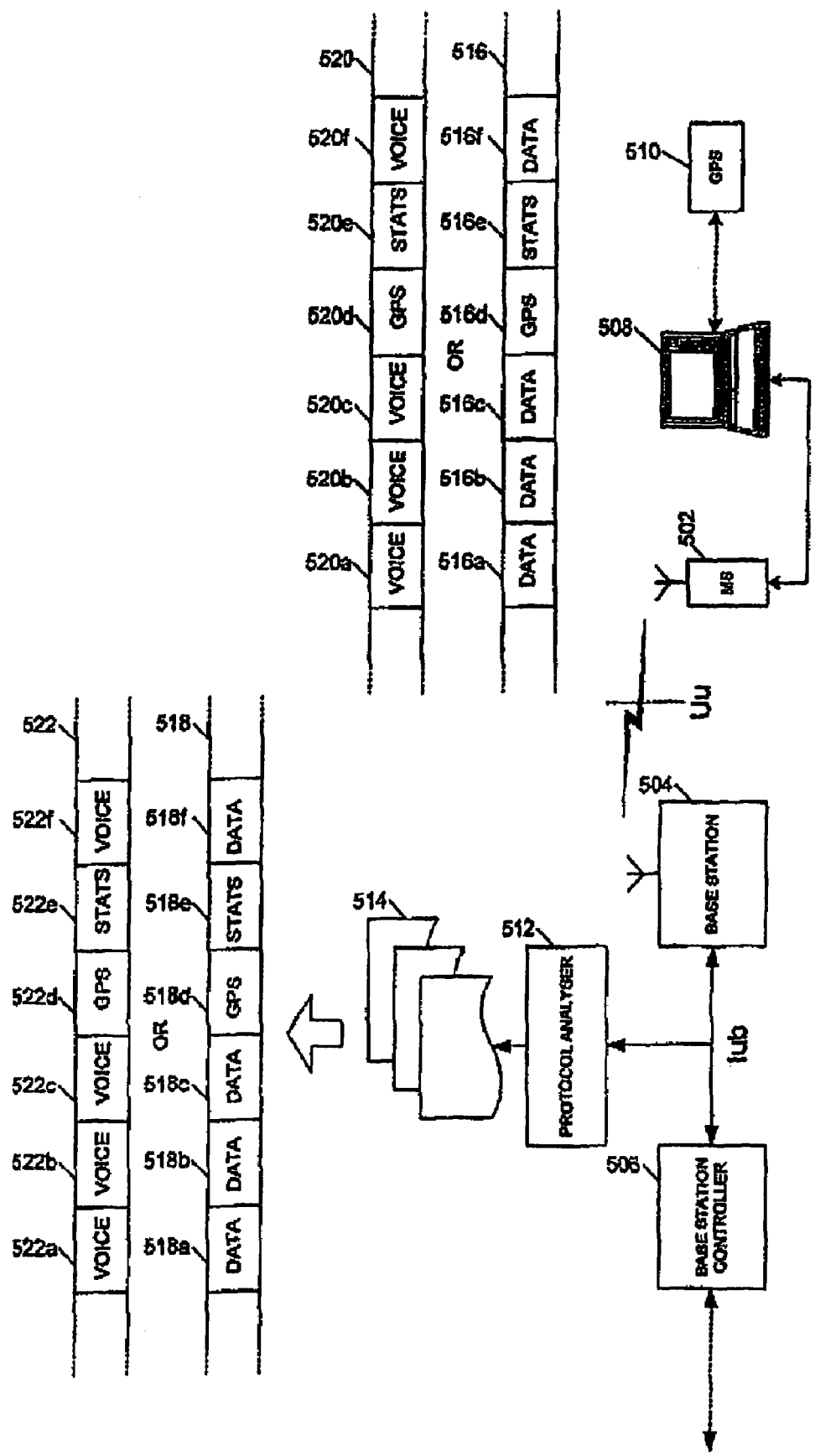
FIG. 5 shows, conceptually, digital mobile phone network testing according to a first embodiment of the present invention.

Referring now to FIG. 5, this conceptually illustrates a method of according to a first embodiment of the present invention. A mobile station or handset 502 is in two-way radio communication with a base station 504, which in turn communicates with and is controlled by a base station controller 506 across an Iub interface. A protocol analyser 512 is coupled to the Iub interface connection between base station 504 and base station controller 506, and is thus able to capture all the signals flowing between the base station and the base station controller and to record these in a series of data files 514 spaced at, for example, 15 minute intervals.

A terminal 508, such as a laptop computer, is connected to mobile station 502 for sending and receiving commands and data to and from the mobile station and thence to another device (not shown). This further device may be another mobile communications device on the same or another network or it may be a device connected to an external network such as the Internet. Optionally a GPS receiver 510 is also connected to terminal 508 to provide information on the position of mobile station 502 which can be used in later analysis.

The combination of terminal 508 and mobile handset 502 simulates a subscriber using a standard mobile phone to make voice or data calls over the mobile phone network. Terminal 508 generates calls and creates test voice or data traffic, such as traffic sequences 520 and 516, in which is embedded measurement data or statistics and other information such as GPS position information. The test traffic may be sent to or received from the further device by the terminal 508. The statistical information, measurements, GPS locations and other data are not stored locally but instead are incorporated within the traffic and sent through the network. The statistical information and/or measurements may include one or more of data throughput rates and voice quality measures.

The embedded information is encoded to allow it to be identified from among the remaining traffic data. The embedded information may be encoded by, for example, tagging the information with unique coding keys or with keys which are expected to occur only rarely within the test traffic. In the case of data traffic the information may be embedded into IP data packets; in the case of voice traffic the information is encoded into the voice channel using a channel coding scheme.

As illustrated in FIG. 5 a test data traffic stream 516 comprises a plurality of data segments 516a-c, 516f into which are interleaved GPS position information 516d and statistical information 516e derived from measurements made by terminal 508 on the test traffic. Similarly in the case of voice test traffic 520, voice segments 520a-c, 520f are interleaved with GPS segments 520d and statistics segments 520e.

A protocol analyser 512 or similar equipment is used to record all of the messaging, both traffic and signalling, at a test interface. In FIG. 5, the Iub (or Gb) interface is illustratively shown as the test interface but other interfaces such as Iup and Iuc could also be used. The recorded messaging contains messaging for mobile phones served by the relevant portion of the network, and in the case of a tap on the Iub interface as shown this information comprises messaging, including air interface messaging, for all the mobile phones attached to the cell served by base station 504 (assuming that all the Iub links for that cell are tapped).

Data processing software is used to process the data files 514 collected by protocol analyser 512, to demultiplex the traffic and signalling streams for mobile station 512 and terminal 508 from the remainder of the recorded data. The demultiplexed traffic streams such as data traffic stream 518 and voice traffic stream 522 correspond to the traffic streams 516 and 520 sent by terminal 508 and handset 502. The traffic for the test mobile station 502 thus contains the statistical 518e, 522e and other data 518a to d, 518f, 522a-d, 522f, embedded into the traffic by terminal 508. The data processing software extracts the statistics and other data from the recorded traffic data streams by recognising the keys used to tag this data, and this information is combined with network performance information which is extracted from signalling on the same link. This combined information may then be used for diagnosing faults, network optimisation and the like.

The statistical information embedded into the traffic may comprise a statistical evaluation of measured test traffic characteristics, such as data throughput or latency averaged over a time period. Additionally or alternatively the embedded information may comprise individual measurements. The statistics may be interpreted differently depending upon the test application, and may take into account factors such as the potential need to sequence out-of-order packets. Inserting statistical data into the test traffic not only allows the performance to be measured but also permits an engineer to find out why the performance is as it is.

Figure 6:
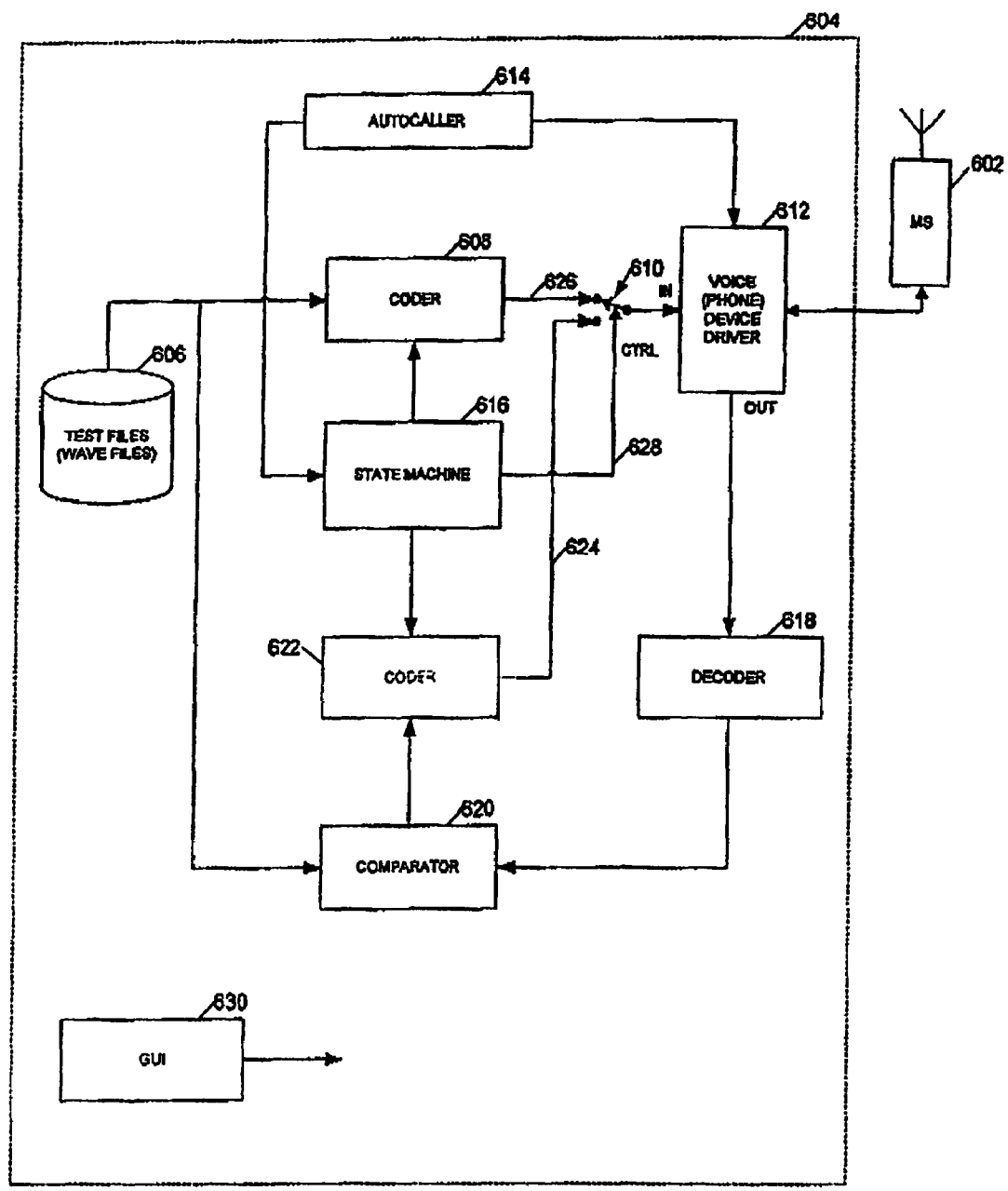
FIG. 6 shows user end equipment for testing a digital mobile phone network with voice traffic.

FIG. 6 shows user end equipment 600 for voice traffic testing of a digital mobile phone network. The equipment comprises a mobile station 602 coupled to a general purpose computer 604 running software components to provide the illustrated functions. A data store 606 stores audio test traffic files in, for example, .wav format. Data store 606 is coupled to a coder 608 which reads data from the data store and provides a digitised audio output 626 to a software switch 610, and thence to a voice phone device driver 612. The device driver 612 interfaces (via a physical serial port) to mobile station 602 to provide MS 602 with digitised audio signals and to control MS 602 to make calls. Device driver 612 also receives digitised audio data received over the digital mobile phone network back from MS 602 and provides this data as an output to a decoder 618, which converts the data to a suitable form for comparison with the stored test audio data.

Sometimes, depending upon the level support of the mobile station for ISDN, a digital audio connection is not available. In this case the user end equipment may include a digital-to-analogue converter, for example on a sound card, for driving mobile station 602 with analogue audio signals. Typically a mobile phone will provide an interface for a hands-free kit which can be used for this purpose.

Comparator code 620 compares the output of decoder 618 with the stored audio data in store 606 and provides an output indicative of the degree of similarity of the two signals and/or signal-to-noise ratio or other audio quality data. The output of comparator code 620 is process by a second coder 622 which provides a coded output 624 to another "terminal" of software switch 610.

The comparator 620 may employ any one of a number of published algorithms for the evaluation of audio samples. Such speech quality algorithms generally compare a measured speech sample with an original version of the speech and provide a score; one such algorithm is ITU-T P.861, also known as PSQM (perceptual speech quality metric). A preferred algorithm is the PAMS algorithm planned for ITU-T P.862, available from Psytechnics of Ipswich, UK which compares reference and degraded signals and returns quality scores from 1 to 5 on two scales, listening quality and listening effort.

Coder 622 encodes measurement/statistical data output from comparator 620 using a channel coding scheme, in a preferred embodiment essentially frequency shift keying based upon a knowledge of the voice coder in use in MS 602 and, optionally, in other parts of the network. For example in a GSM network voice coding is performed using a Regular Pulse Excited-Linear Predictive Coder (RPE-LPC) in which frequencies near pre-determined key tone frequencies are transmitted only slightly changed. For example, a 300 hertz tone might be received as a 347 hertz tone with 2 dB attenuation. Preferably one, two or more of such tones are identified and used to encode data "1"s and "0"s. In practice the volume of statistical/measurement data sent is low—for example, 20 to 30 bits may be sent over a period of 1 sec—and it has been discovered that when operating at speeds of less than 100 bps conventional frequency shift keying can be used successfully encode the embedded data.

The software switch 610 interleaves test data 626 and encoded measurement data 624 in accordance with a control signal 628 provided by a state machine 616. The state machine 616 is itself controlled by autocaller code 614 which controls phone device driver 612 to control MS 602 to make (and/or receive) voice calls.

The voice calls may either be made between two mobile stations each connected to user end equipment as shown in FIG. 6, one acting as a master, the other as a slave, or voice calls may be made to or from a server. In this latter case similar functionality may be provided by means of a voice card, for example from Dialogic of Parsippany, M J, USA, installed in the server with an interface using Microsoft's TAPI (telephony API). The TAPI allows a number to be dialled and provides, for example, either PCM (pulse code modulation) data bytes comprising the voice traffic or, with an analogue line and card, packets of wave format data. In this way functionality equivalent to that of FIG. 6 can be implemented on a server.

State machine 616 controls coder 608 to read data from a set of test traffic files in data store 606, reading each test file in turn in a repeating loop. State machine 616 also provides a control output for coder 622 and a control output 628 for software switch 610. The state machine controls coder 608, coder 622 and switch 610 in co-ordination such that when coder 622 has enough data to constitute a segment of the test traffic switch 610 is thrown so that device driver 612 receives data 624 from coder 622 rather than test traffic 626 from coder 608. Once the statistical or measurement data from coder 622 has been passed to voice phone device driver 612 the switch 610 is returned to its original position again output traffic from coder 608. In this way test traffic and statistical/measurement data are interleaved, typically in a ratio of 5:1 to 100:1, preferably in a ratio in the region of 20:1. Graphical user interface code 630 is also provided to allow a test equipment operator to select test parameters such as a traffic/measurement interleaver ratio, an FSK (Frequency Shift Keying) encoding method/audio codec employed, and/or a sequence of one or more test files to employ.

Figure 7:
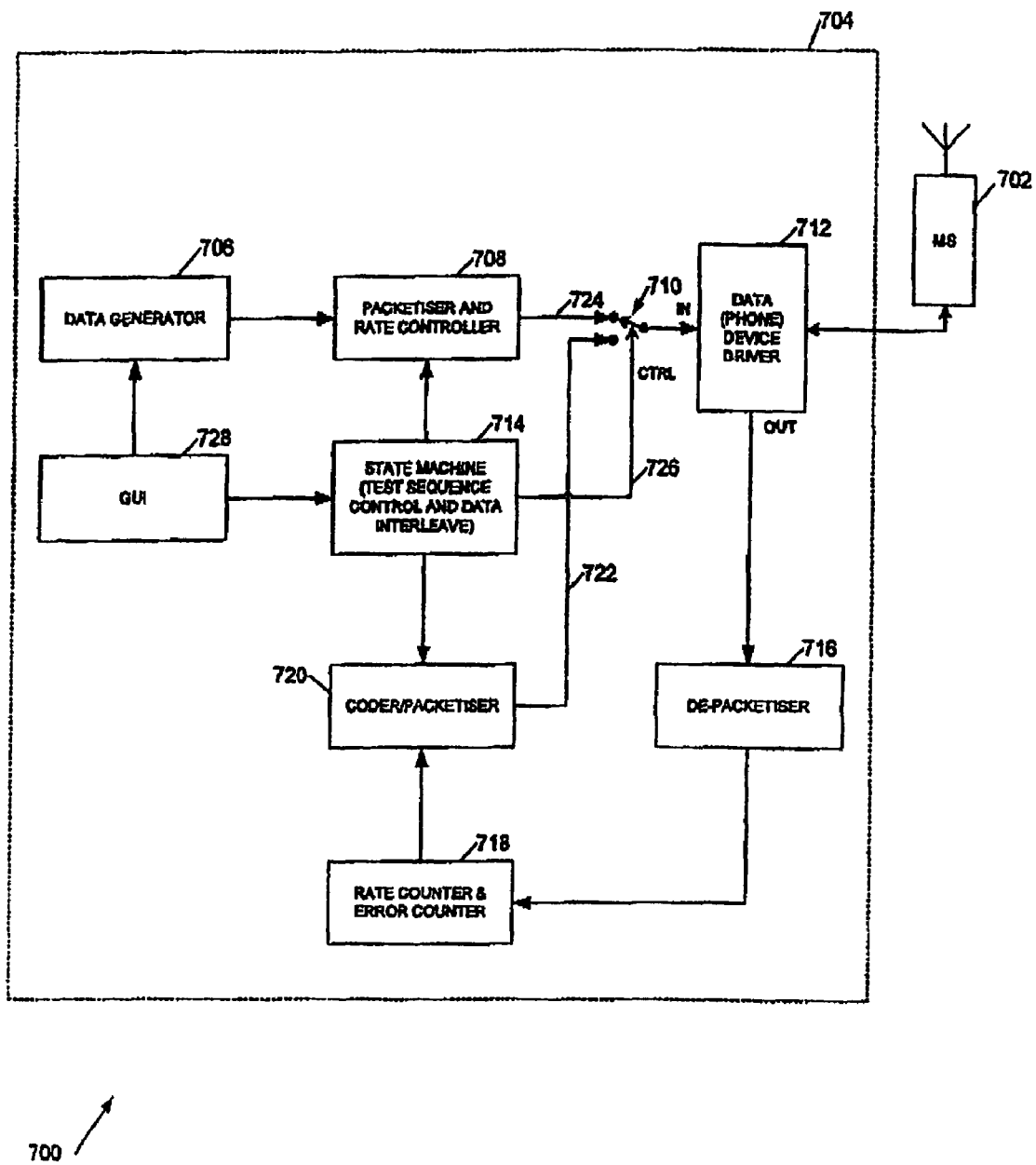
FIG. 7 shows user end equipment for testing a digital mobile phone network with data traffic.

FIG. 7 shows user end equipment 700 similar to that shown in FIG. 6, for testing a digital mobile phone network using packet data test traffic. As described with reference to FIG. 6, the equipment comprises a mobile station 702 coupled to a suitably programmed general purpose computer 704 running software to provide the functions illustrated by the functional blocks within dashed line 704.

A data generator 706 generates test traffic, which may be randomly generated traffic, but which preferably comprises data from one or more test data files. These test data files may comprise data to be transmitted over the network or they may comprise instructions, for example to download data from a website or to set up a video phone call or to send or receive TCP, UDP, or other data packets.

Data from data generator 706 is processed by packetiser and rate controller code 708 to generate TCP, UDP or other protocol data packets on output 724 and, similarly to the arrangement in FIG. 6, these packets are passed via a software switch 710 to a data phone device driver 712. Data phone device driver 712 sends and receives data and commands to and from MS 702, in a GPRS or 3G network using a standard set of AT commands. Data received by MS 702 and passed to device driver 712 is depacketised by code block 716 and processed by code block 718. In the illustrated embodiment code block 718 comprises a bit or packet rate counter and a bit or packet error counter, although other data processing functions may be additionally or alternatively be employed. A bit or packet error counter may be employed with a non-transparent protocol such as UDP. Optionally processing code 718 may also output information about the data from data generator 706 being used to exercise the mobile phone network. The raw measurements, or statistics compiled from the raw measurements, are provided to a coder/packetiser 720 which has an output 722 to switch 710.

Coder/packetiser 720 also adds a tag data sequence to the packetised measurement and other data to allow this data to be retrieved from the test traffic. The tag data sequence is selected to be one which is known not to occur in the test traffic or, where the test traffic composition is not known because, for example, it comprises data downloaded from the website, the tag data sequence is selected to be one which is very unlikely to occur by chance within the test traffic. For example a repeated "101010 . . . " pattern may be used, with a sequence length of more than 30, and preferably more than 100 bits.

As with the arrangement of FIG. 6, a state machine 714 controls packetiser and rate controller 708, coder/packetiser 720, and switch 710 in co-ordination to interleave measurement data with the test data traffic. The state machine 714 controls the test sequence (and may also control data generator 706), as well as test traffic parameters such as block length and data rate. State machine 714 may also interface to device driver 712 in order that the data rate can be controlled to be less than, equal to, or greater than a maximum data rate allowed for a packet data session over the mobile phone network. Since MS 702 is effectively in an "always on" state for data traffic once it has attached to the mobile phone network there is no need for an autocaller. As with the voice test traffic system of FIG. 6, however, a graphical user interface 728 is provided to control the data generator 706 and state machine 714 to set the required type of test, to select or programme a test sequence, to enter test data and/or instructions, and/or to set other test parameters.

In the arrangements of both FIGS. 6 and 7 a GPS device driver code portion (not shown) may be employed to interface with a GPS receiver to provide GPS position data. This is encoded and embedded into the test traffic, by coder 622 or coder 720 respectively, in a similar way to the measurement/statistical data.

Figure 4A:
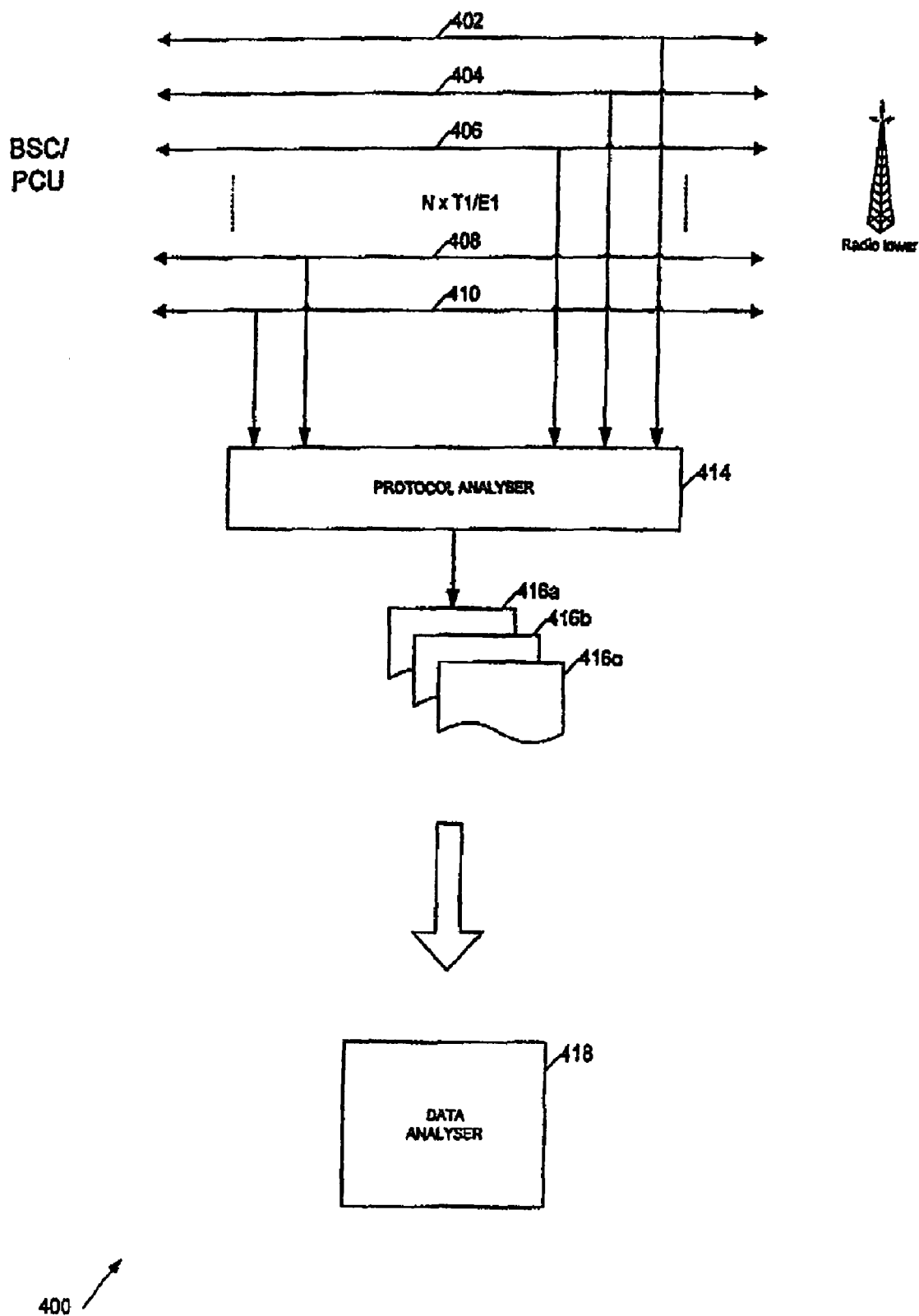
Figure 8:
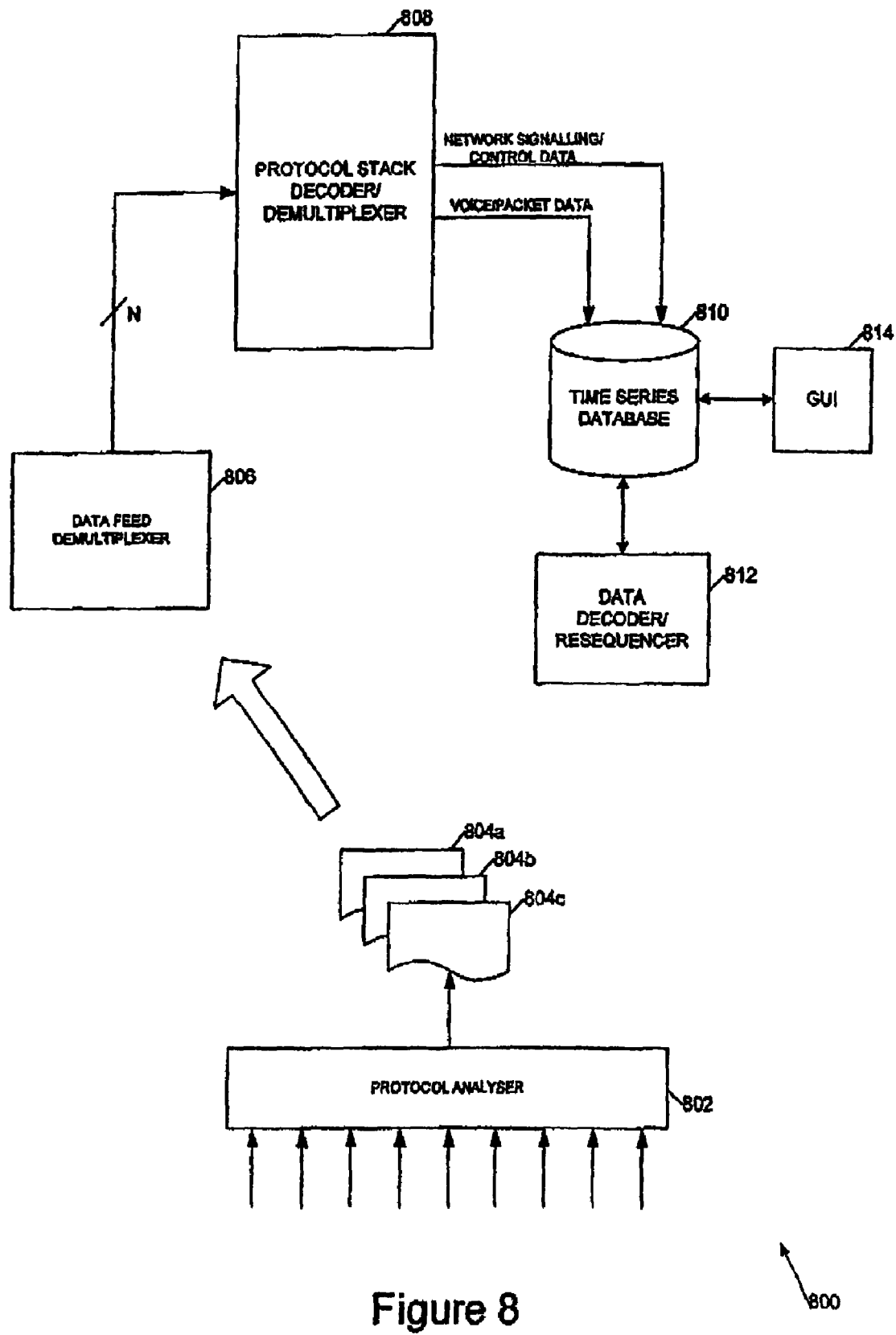
FIG. 8 shows test equipment for decoding test traffic created by the user end equipment of FIG. 6 or 7.

Referring now to FIG. 8, this shows test equipment for decoding test traffic 800 created by the subscriber end equipment of FIG. 6 or FIG. 7. A protocol analyser 802 captures data from an interface, reference point, or other point within a digital mobile phone network and writes the captured data into a set of data files 804a-c, in a similar way to the prior art method described with reference to FIG. 4a. The data files 804 may be accessed directly via a computer network or indirectly by copying the data into a removal storage medium for later processing and analysis.

Data from one or more data feeds tapped by protocol analyser 802 is demultiplexed by data feed demultiplexer 806 and passed to a protocol stack decoder/demultiplexer 808 which extracts messaging, comprising voice/data test traffic and associated signalling, for a test device such as MS 602, 702 of FIG. 6 or 7 from the remainder of the captured data. At the Abis interface this can be performed by the conventional CallTracker software available from Actix Limited, which analyses all the Abis messages for call initiation sequences. The phone number of MS 602, 702, in a GSM network the IMSI (International Mobile Subscriber Identity), is known and this can be used to identify call initiation from or to the test mobile device. Once call initiation from the mobile has been detected the time slot information allocated to the call is logged and hand over and other time slot control messages are interpreted using a protocol stack decoder to track the time slot allocated to the call and hence thread together test traffic and signalling data associated with the call. The techniques applied at other interfaces within the system correspond although extracting the data is simplified at the higher levels because time slot and radio resource allocation is generally omitted.

In the case of a data call a packet domain subscriber identified by an IMSI has one or more associated PDP (Packet Data Protocol) addresses either temporarily or permanently associated with it. These addresses are either IP version 4 addresses or IP version 6 addresses, and are activated and deactivated through mobility management procedures according to PDP context activation procedures described in, for example, the 3GPP technical specification 23.060.

In a GPRS packet data network user data is transferred between the MS and an external data network by means of encapsulation and tunnelling, in which data packets are equipped with packet-switched-specific protocol information and transferred between the MS and the GGSN. Packets are transferred between the MS and SGSN either using SNDCP (Sub-network Dependent Convergence Protocol), or in 3G networks, GTPU (GPRS Tunnelling Protocol for User Plane) and PDCP (Packet Data Convergence Protocol). Between the SGSN and the GGSN packets are transferred using UDP-IP protocols, through tunnels identified by a TEID (Tunnel End Point Identifier) and a GSN (GPRS Support Node) address. A Network Layer Service Access Point Identifier (NSAPI) is used in conjunction with the ISMI to assign a Tunnel End Point Identifier (TEID).

The NSAPI is used in association with a Temporary Logical Link Identity (TLLI) for network layer routing, and an NSAPI/TLLI pair is unambiguous within a routing area. The TLLI (Temporary Logical Link Identity) identifies a GSM user but the relationship between the TLLI and IMSI is known only in the MS and in the SGSN, to preserve user identity confidentiality (this applies in a GSM-type network; similar considerations apply in a UMTS based network). However the TLLI can be captured by programme code (not shown) running on the computer 604 of FIG. 6 or computer 704 of FIG. 7, and this can be provided to protocol stack decoder/demultiplexer 808 to extract the packet data traffic for the test mobile communications device. Since this information is available once the MS has attached to the network. The information may be provided before the test sequence begins, to allow for real time decoding and analysis of the captured test traffic and associated signalling. This allows packets of a session to be tracked and pulled together.

In an alternative approach a characteristic data pattern is inserted into one or more data packets sent from the mobile station, to allow at least one packet sent from the MS to be picked out or at least provisionally selected as a candidate data packet from the MS. Such a fingerprint bit pattern preferably comprises a sequence of bits, for example a random or pseudo-random bit sequence. The bit sequence is preferably long enough to make it unlikely that the sequence will occur by chance within the intercepted data; preferably the sequence comprises at least four bytes, and more preferably more than ten bytes. In one embodiment a sequence of 24 bytes is employed. In practice the length of the sequence is limited by the length of a packet, and this can be up to 1500 bytes for an IP packet, although normally packets are split down into shorter lengths for transmission using a mobile phone network. The maximum packet length is generally operator dependent but is normally ample for inserting such characteristic data into a packet.

Once a candidate packet has been identified from amongst the captured data the TLLI for the packet can be read and all the corresponding (either later and/or earlier) packets with that TLLI can then also be selected to reconstruct a datastream. Where a relatively short fingerprint bit pattern is employed there is a possibility that an incorrect datastream will have been picked out due to the chance occurrence of the fingerprint bit pattern in data from a mobile station other than that which is exercising the network and measuring its characteristics. However the question of whether or not the correct datastream has been identified can be resolved by attempting to decode encoded measurement data from within the data packets since, if the wrong datastream has been identified, this will not be successful.

Use of a fingerprint test pattern or characteristic data to identify the datastream of interest is generally the preferred method of picking out the data relating to the test MS as in this case all the relevant information can be derived from data tapped from an interface within the network. It will be appreciated that the fingerprint pattern need only be inserted into one IP packet of a session since once this packet has been identified the rest of the session can be extracted by threading along the TLLI.

In the case of a UMTS-type network a Radio Network Temporary Identity (RNTI) performs a similar role to the TLLI and identifies a UMTS user. The relationship between the RMTI and the IMSI is known in the MS and in the UTRAN (Universal Terrestrial Radio Access Network) and may therefore be furnished to the decoder/demultiplexer 808 in a similar way to the TLLI. A P-TMSI (Packet Temporary Mobile Subscriber Identity) identifies the UMTS user between the MS and the SGSN and, again, the relationship between the P-TMSI and the IMSI is known in the MS and the SGSN.

From the foregoing discussion it will be appreciated that sufficient information is available to the protocol stack decoder/demultiplexer to extract the test traffic data packets and associated signalling from the data files 804 captured and recorded by the protocol analyser 802.

The demultiplexed or "dethreaded" test traffic and signalling data from decoder/demultiplexer 808 relating to the test MS and its driver terminal is stored in a time series database 810. At a later time, or substantially concurrently, a data decoder/resequencer code portion 812 operates on the data stored in time series database 810 to extract the statistics or other measurement data, and optional GPRS position data, from the test traffic and resequences this data along-side the test traffic and associated signalling data. Graphical user interface 814 provides a plurality of user display options for the data in time series database 810. These options may include a simple list of the test traffic, associated network signalling and control data and statistics/measurement/position data in a time-ordered sequence, as well as one or more graphical presentations of the data.

Figure 9:
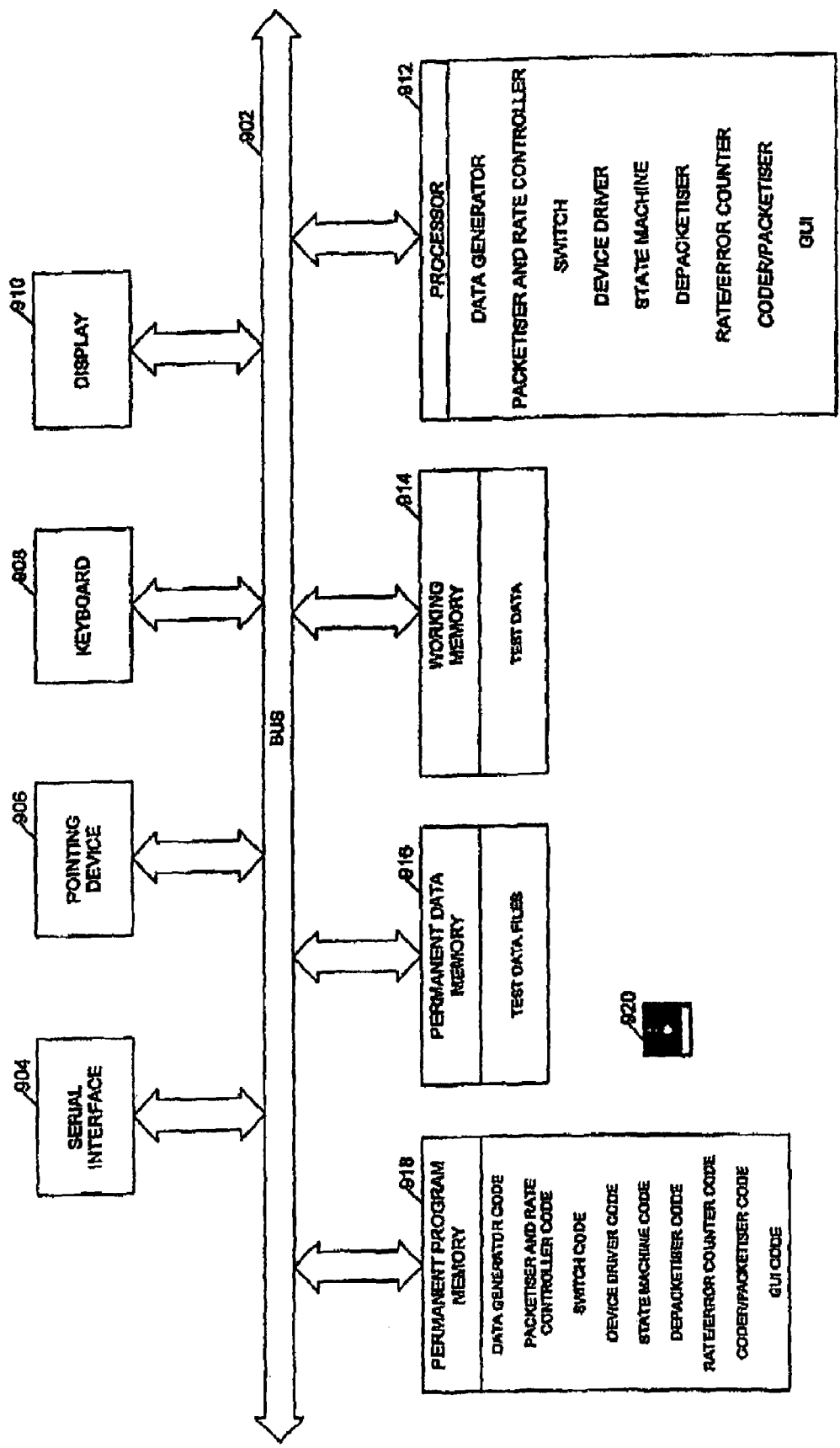
FIG. 9 shows a general purpose computer suitable for implementing digital mobile phone test equipment software.

It will be appreciated that the functional blocks 806, 808, 810, 812, and 814 of FIG. 8 preferably comprise portions of programme code running on a general purpose computer such as a laptop computer. The main components of exemplary general purpose computer 900 which may be employed for such a purpose are shown in FIG. 9. In FIG. 9 the computer is shown having programme code elements corresponding to the data test traffic user equipment of FIG. 7, but code to implement the user equipment of FIGS. 6 and 8 can be implemented on a similar general purpose computer in a corresponding manner.

The computer 900 of FIG. 9 comprises a data and address bus 902 to which are connected a serial interface 904 for interfacing to a mobile station such as mobile station 702 of FIG. 7, a pointing device 906 such as a mouse, a keyboard 908, and a display 910. Permanent programme memory 918 provides local data storage for programme code for controlling the computer to perform the desired functions. In the embodiment of FIG. 9, the programme code comprises data generator code, packetiser and rate controller code, software switch code, device driver code, state machine code, depacketiser code, rate/error counter code, coder/packetiser code, and graphical user interface code. Permanent data memory 916 stores test data files comprising test traffic data. The permanent programme memory 918 and permanent data memory 916 may comprise non-volatile storage such as a hard disk. Some or all of the contents of the permanent programme memory and permanent data memory may also be provided on portable storage media such as floppy disk 920. The computer also includes working memory 914, illustrated storing test data. The permanent programme memory 918, permanent data memory 916, and working memory 914 are all coupled to bus 902 and a processor 912 is also coupled to bus 902 to load and implement code from the permanent programme memory. As illustrated processor 912 implements the code to provide a data generator, a packetiser and rate controller, a switch, a device driver, a state machine, a depacketiser, a rate/error counter, a coder/packetiser, and a graphical user interface.

Figure 10:
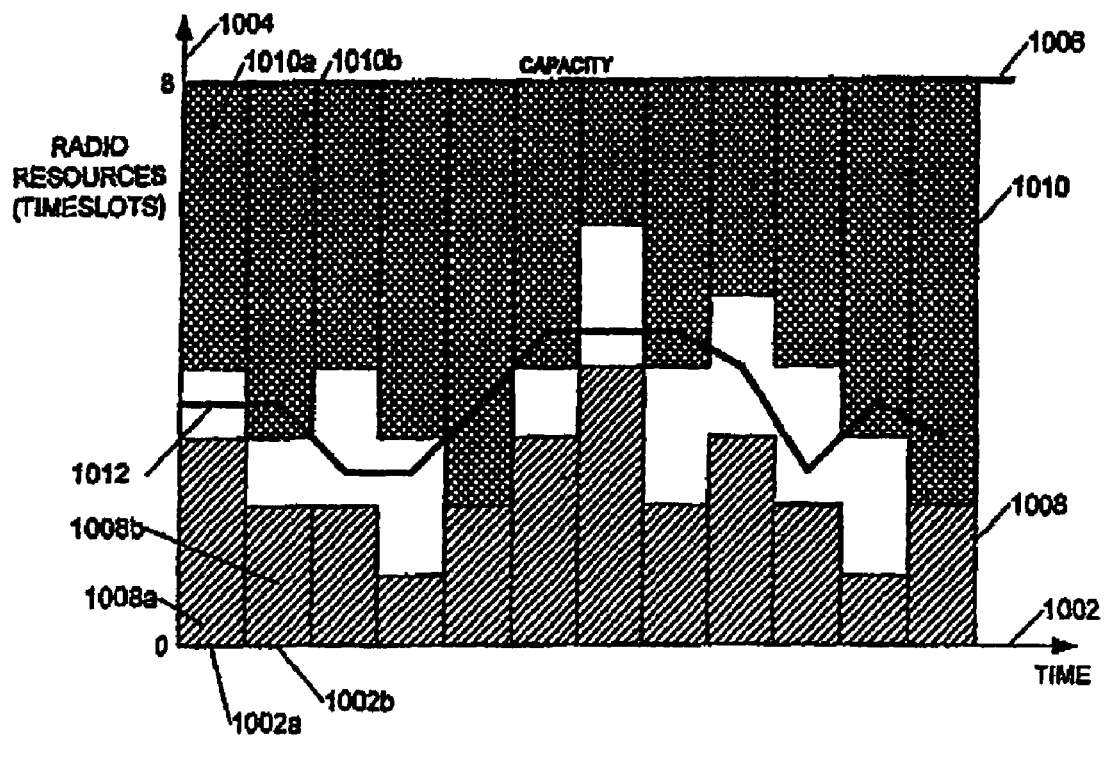
FIG. 10 shows an exemplary graphical output from the test equipment of FIG. 8.

Referring now to FIG. 10, this shows a particularly preferred graphical presentation of the data in the time series database 810 of FIG. 8, provided by graphical user interface 814.

A display 1000 comprises a time axis 1002 and a radio resources axis 1004 which, in a case of a GSM-type network, is graduated in (frame) timeslots. In other networks usage of radio resources may be displayed differently. For each of a series of consecutive and sequential times, such as times 1002a and 1002b, the display shows a level of radio resources 1008a, 1008b allocated to data transmission and a level of radio resources 1010a, 1010b used by voice calls on the same interface.

The radio resources allocated to data packets are indicated by bars 1008, which grow upwards as more radio resources are allocated and the resources allocated to voice users are indicated by bars 1010, which grow downwards from a maximum capacity level indicated by line 1006. It will be appreciated that when bars 1008 and 1010 meet the available radio resources are being utilised to their maximum capacity.

Display 1000 also depicts the one or more measured parameters or statistics extracted from the test traffic, for example a line such as line 1012 in FIG. 10. This allows a side-by-side visual comparison of the subscriber end measurements with the allocated data and voice radio resources, simplifying interpretation of the data and facilitating network fault diagnosis and optimisation. The display 1000 shows the network's dynamic response to the test traffic, and the time intervals at which successive radio resource allocation and measured parameters are presented may be selected according to the type of diagnostic information required. Thus they may range from, for example, time intervals of the order of a burst period, frame or multiframe, that is less than 200 ms, up to time periods of the order of seconds, minutes, or even hours. The display 1000 of FIG. 10 may be presented in pseudo-real time.

It will be appreciated that the precise form of the data presented will depend upon the interface being tapped, and the format of FIG. 10 is particularly suitable where the Abis or PCU Abis (or corresponding interfaces) have been tapped. It will be recognised that for the display format of FIG. 10 to be employed radio resource allocation data must be available at the tapped interface.

The display format of FIG. 10 may be varied whilst retaining its fundamental value, which arises from being able to see network radio performance in comparison with data metrics such as data throughput and/or data delay. Thus, for example, the axis and bar-chart type format in display 1000 are optional and a plurality of lines 1012 (or other graphical formats) may be provided to display a plurality of measured parameters. Other data may also be included on display 1000 such as, for example, an indication of the negotiated quality of service for a packet data session.

Figure 11:
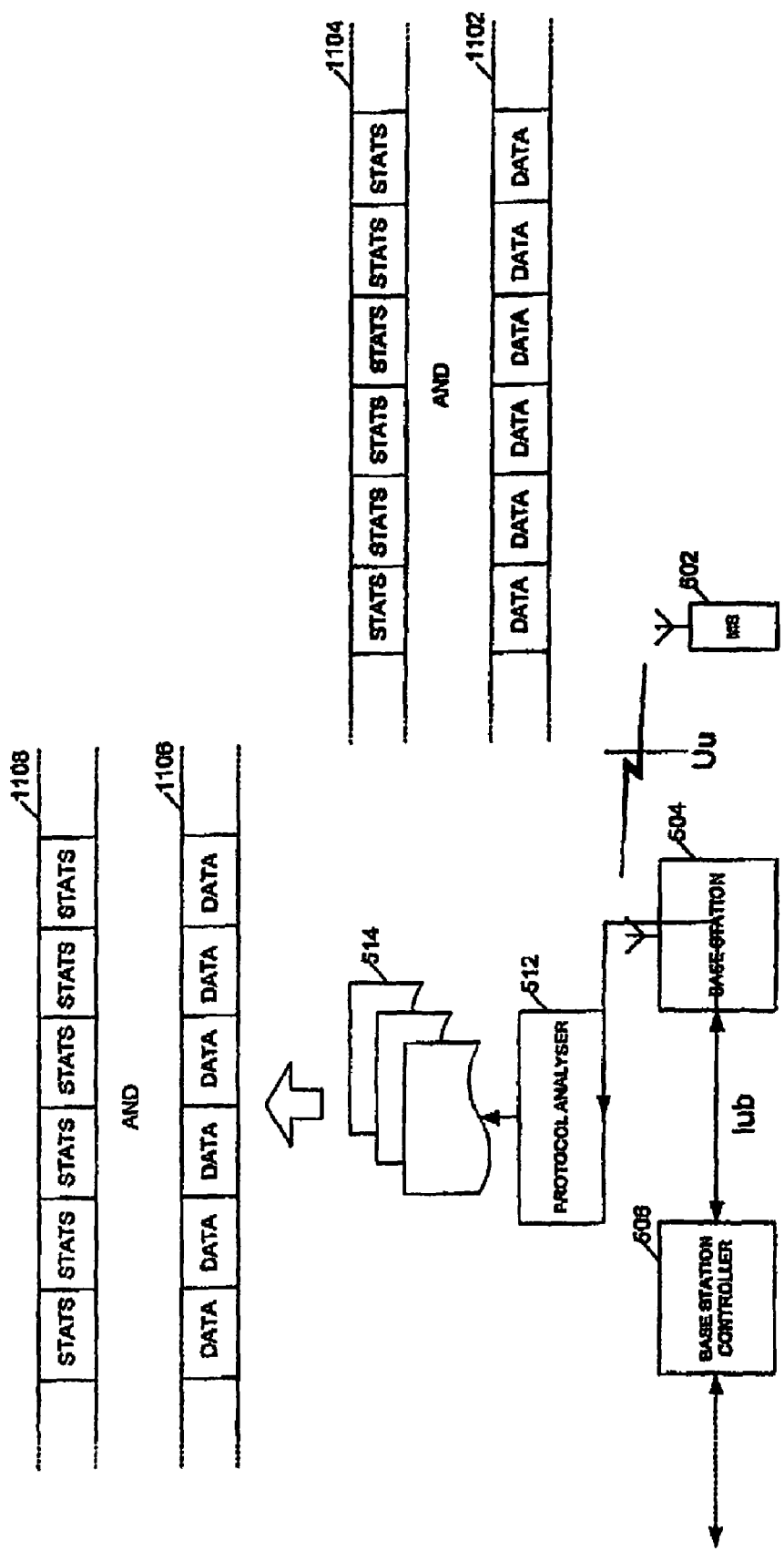
FIG. 11 shows, conceptually, digital mobile phone network monitoring according to a second embodiment of the present invention.

Referring now to FIG. 11, this illustrates a variant of the above-described method, according to a second embodiment of the invention. Broadly speaking the elements of FIG. 11 correspond to those of FIG. 5 and are indicated by corresponding reference numerals. However instead of a separate terminal 508 being connected to mobile station 502, software for facilitating operation of the method is stored within mobile station 502, as described in more detail below with reference to FIG. 13.

A significant difference between the methods illustrated by FIGS. 11 and 5 is that in FIG. 11 a software agent within MS 502 monitors real traffic 1102 rather than test traffic, and transmits a second stream of traffic 1104 including information derived from this monitoring, to some remote destination such as a remote server. This real traffic, or at least signalling associated with this real traffic, may then be captured at an interface within the network and stored (traffic 1106) together with the information transmitted by the agent, traffic 1108. Although these traffic streams will not generally be correlated at the interface they may be processed, in a similar manner to that described with reference to FIG. 8 above, to align these two data streams so that signalling data for the real subscriber traffic may be associated with "measurement" data, that is data characterising the real traffic, to allow analysis of the network's performance.

The real traffic for MS 502 may be identified, for example, based on a device identifier such as an IMSI, which may then be linked to, for example, a TLLI which may be used at a lower level within the network. Thus, for example, data may be collected from the GPRS Gr interface to obtain the IMSI and this may then be used to identify the real traffic stream at a lower level, such as the Gb or Iup interface (for signalling) or the Abis or Iub interface (for radio). The TLLI may be identified, for example, retrospectively based upon the connection or connections to the mobile device which were current at the time the (data) call was taking place. Additionally or alternatively the measurement data, which can be detected by its characteristic pattern for example at the start of each packet of measurement data, can be used to assist in identifying real subscriber traffic for the same device. In one embodiment, as illustrated in FIG. 11, all the information from one or more links between infrastructure elements in the network, such as a link between the base station controller and the IP router (the SGSN in GPRS) may be captured and analysed retrospectively. This information will include the statistics and other data generated or collected by the agent in the user's mobile device and reported back through the network. It will be recognised that this simplifies the combination of messaging relating to the transmission link between the user and the IP network and the statistics relating to the user's experience of using the mobile network. More specifically this can be achieved for real subscriber traffic rather than simply for test traffic.

Figure 1A:
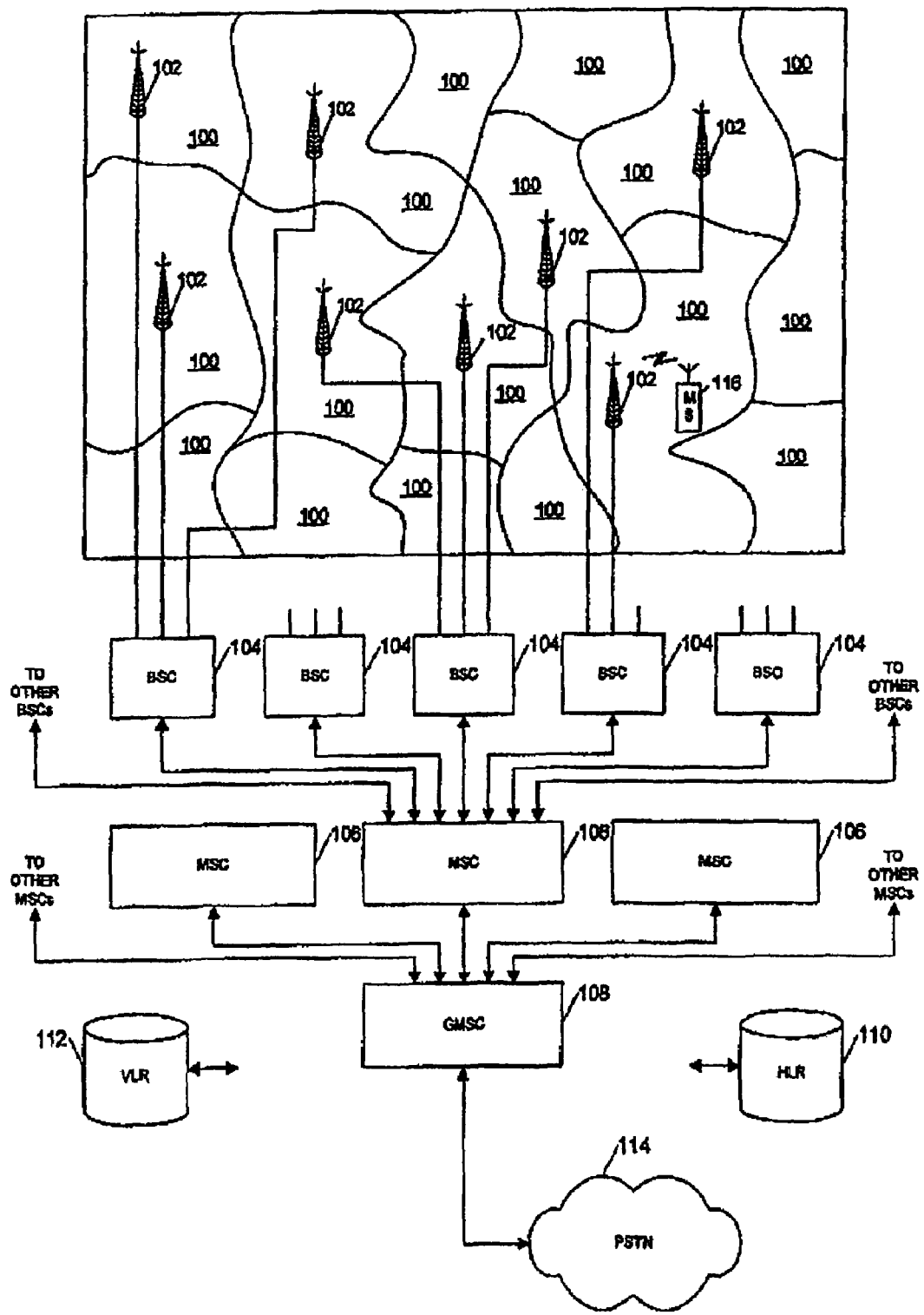
FIGS. 1a and 1b show, respectively, a generic structure of a conventional mobile phone network, and an example of a map generated by drive testing.
Figure 1B:
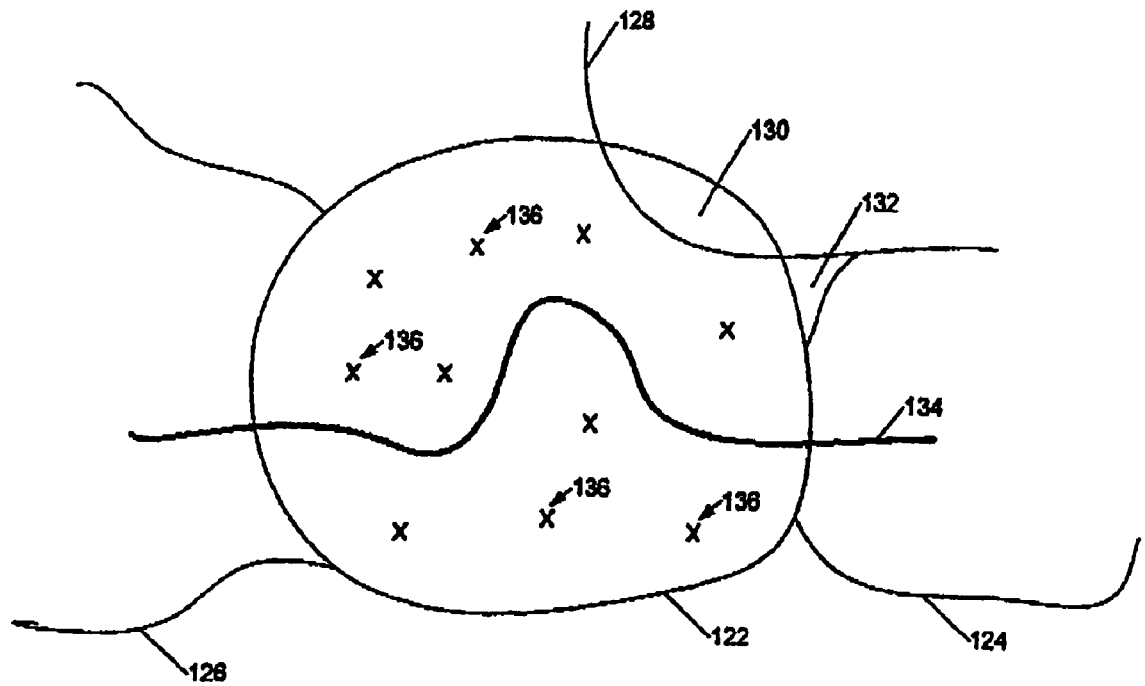
Figure 4B:
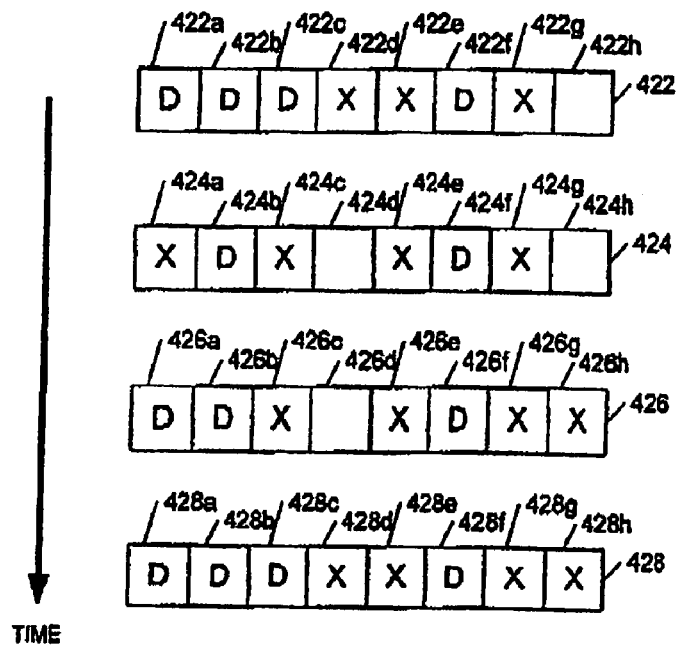
FIGS. 4a and 4b show, respectively, digital mobile phone network testing using a protocol analyser according to the prior art, and dynamic reallocation of packet data traffic time slots in a GSM-GPRS mobile phone network.
Figure 2:
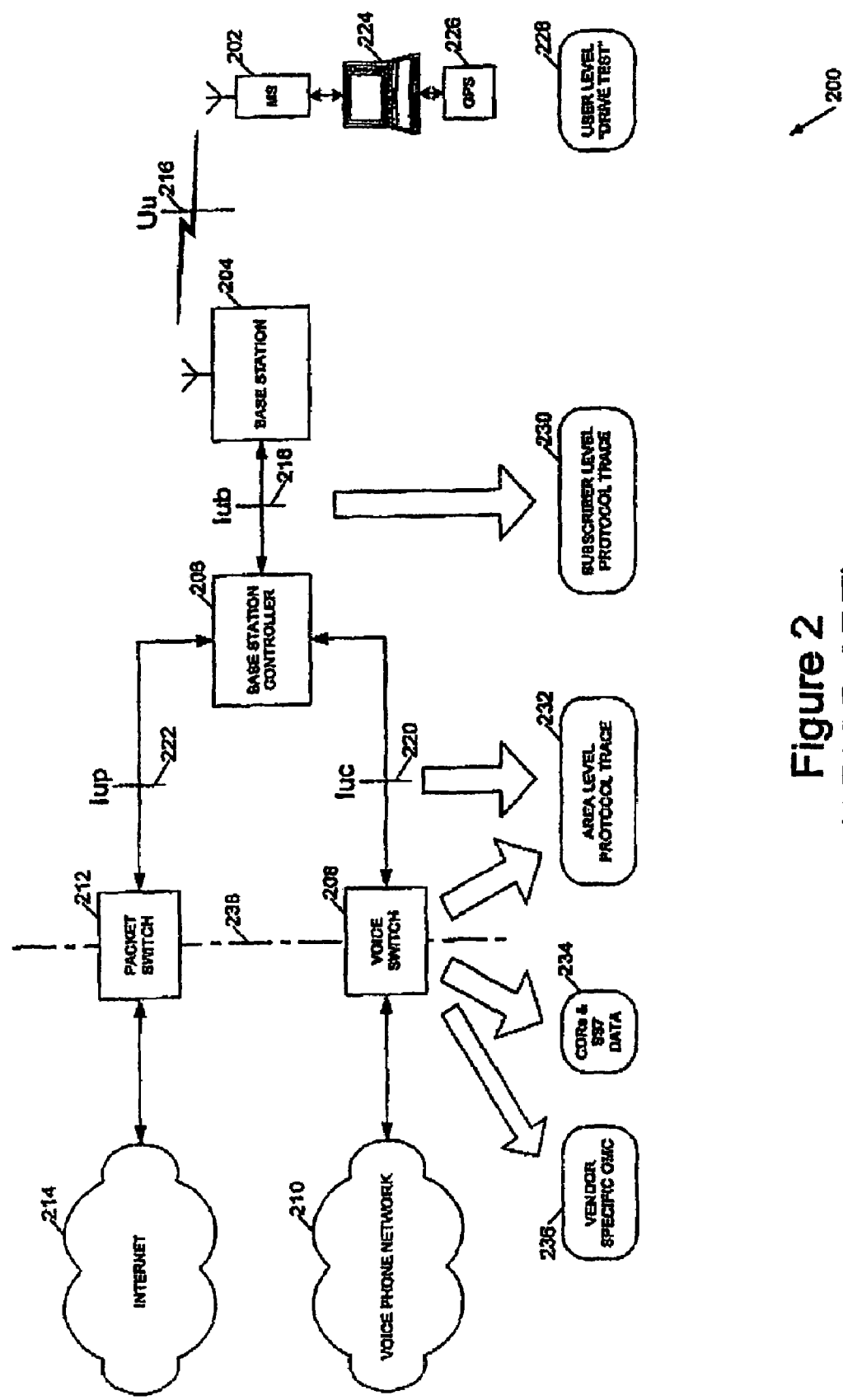
FIG. 2 shows a generic structure for a digital mobile phone network illustrating prior art test data sources.
Figure 3A:
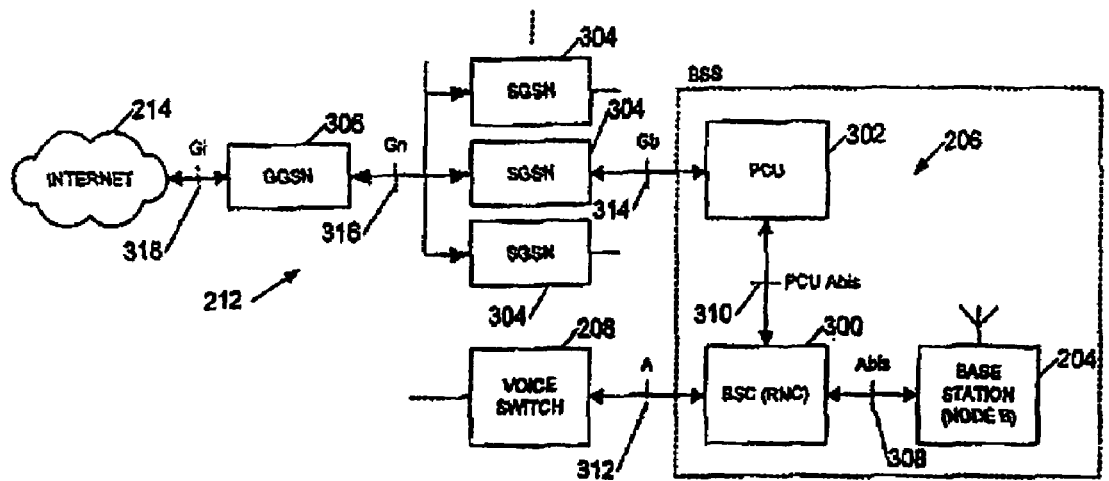
FIGS. 3a and 3b show, respectively, details of a mobile phone network supporting GPRS functionality, and user end equipment for a digital mobile phone network.
Figure 3B:
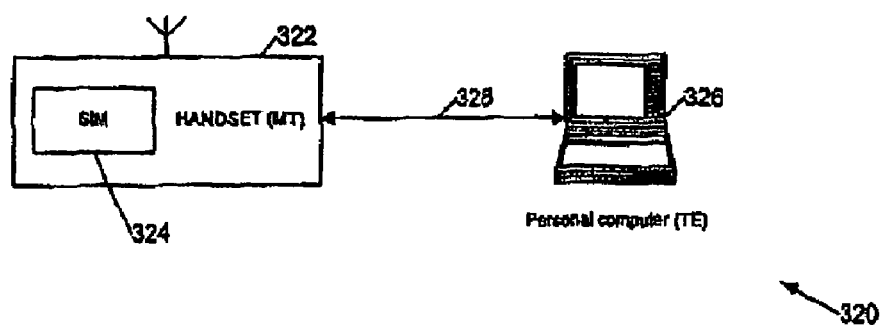
Figure 12:
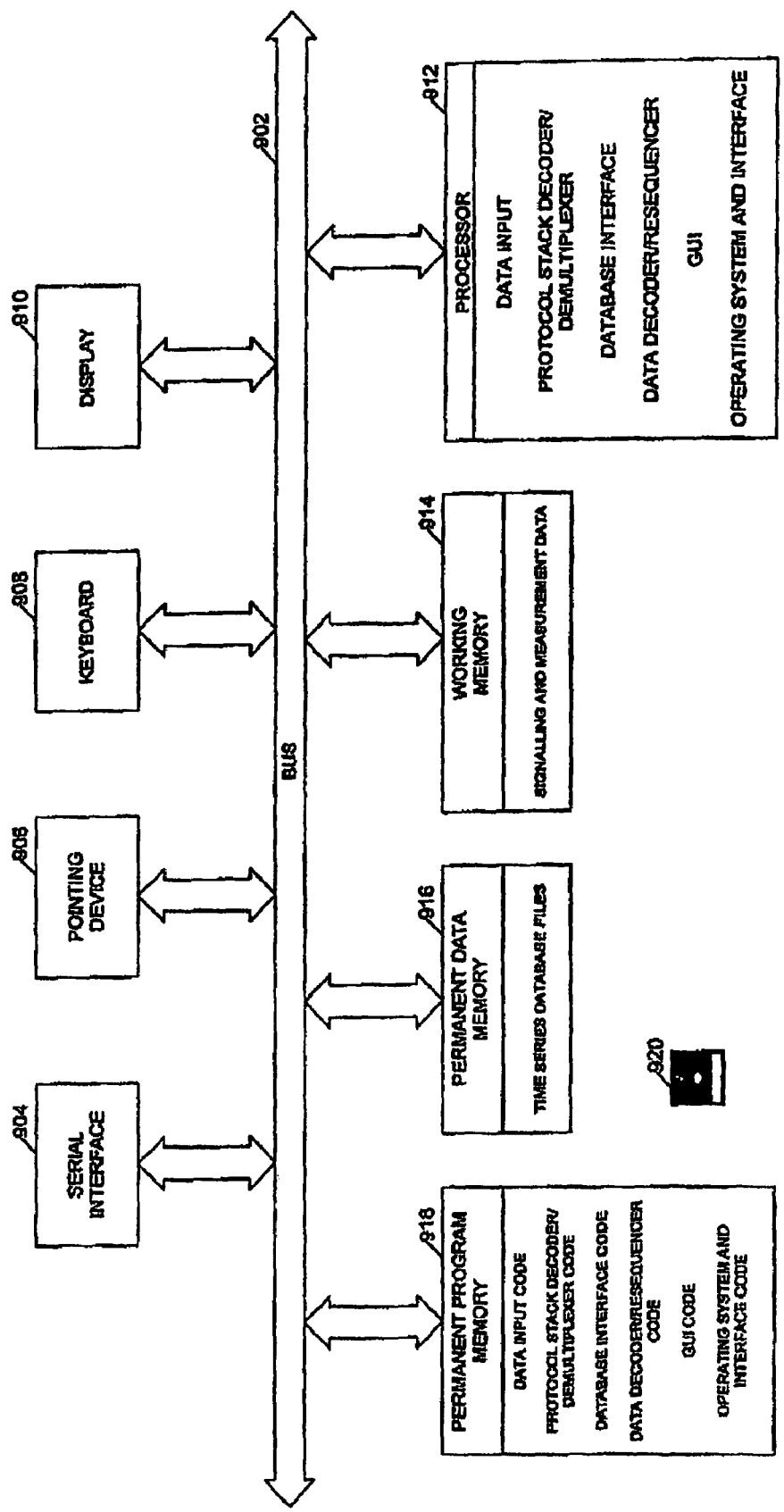
FIG. 12 shows a general purpose computer system for implementing performance monitoring data capture and analysis code.

FIG. 12 shows a general purpose computer system 1200 programmed for analysing the captured signalling and measurement data from the network interface. Broadly speaking the elements of FIG. 12 correspond to those of FIG. 9 described above and like elements are denoted by like reference numerals. However in the case of FIG. 2 permanent programme memory 918 stores data input code, protocol stack decoder/demultiplexer code, database interface code, data decoder/resequencer code, GUI code and other operating system and interface code; permanent data memory 916 stores time series database files; and working memory 914 stores signalling and measurement data.

Figure 13:
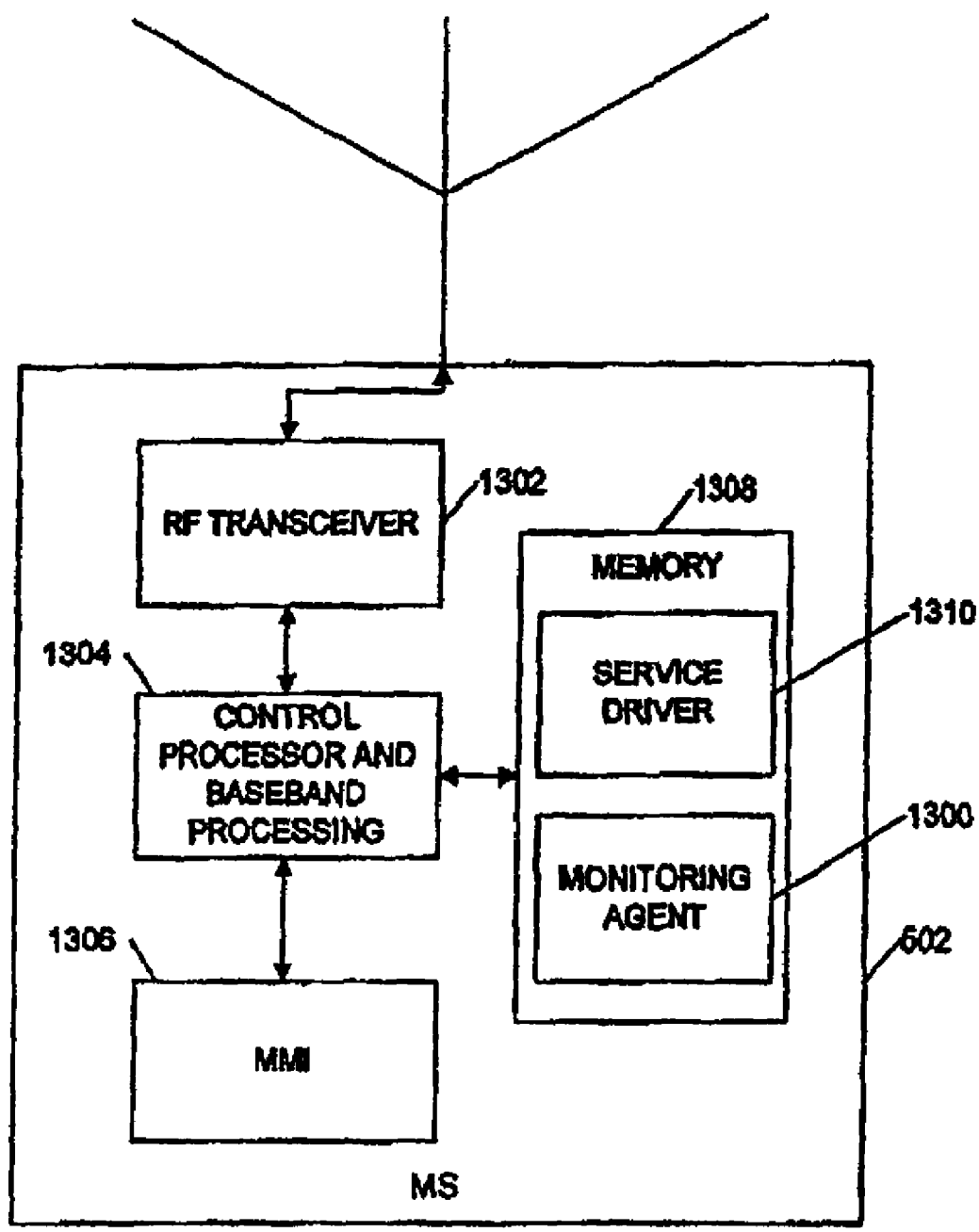
FIG. 13 shows a mobile device incorporating a performance monitoring agent.

FIG. 13 shows a simplified block diagram of MS 502 incorporating a monitoring agent 1300. As will be understood by the skilled person MS 502 typically comprises an rf transceiver 1302 coupled to a control processor and baseband processing block 1304, in turn coupled to a man-machine interface (MMI) 1306. Baseband processing block 1304 is coupled to memory 1308 storing program code for control and baseband processing functions (not shown, for clarity) as well as, in the illustrated example, service driver code 1310 for providing a service to a user of MS 502, such as an email, picture, video or other service, and monitoring agent code 1300. Generally, although not necessarily, the monitoring agent will be run on a processor which is logically separate from the communications device but physically packaged in the same enclosure but, for simplicity, such a separation is not shown in FIG. 13.

The agent 1300 is able to monitor real traffic such as a traffic managed by service driver 1310 and is able to compute the statistics relating to this traffic and/or retrieve data relating to the traffic from other elements of MS502. Agent 1300 then transmits these statistics and other data up the network towards a server, generally hosted somewhere on the IP network of the phone system. It will be appreciated, however, that for embodiments of the invention it is not particularly important where the server is located so long as data from the agent is sent through the network. Information may be collected by the agent from a variety of sources before it is formed into a single stream and transmitted back through the network; because the data is reported as a single stream this greatly simplifies the later correlation process.

The information collected by the monitoring agent 1300 is to some extent application (service) dependent. The information may include protocol type information (HTTP, SMTP, FTP and the like, at the application layer), APN (Access Point Name) information and similar information helpful in determining a type of service delivered (in a similar way to the way in which a "well known port number"—RFC1700—determines a type of service on the Internet), and statistical information. The statistical information may comprise measurements of throughput (such as mean or peak throughput), delay, bit error rate, signal-to-noise ratio and the like. Other data such as whether or not the mobile station 502 is roamed may also be included. Where MS 502 has two more concurrent data sessions aggregate statistics may be provided or statistics may be aggregated and separated out by service type. The skilled person will appreciate that many variations are possible, but once data has been passed by agent 1300 through the network and picked off from a point within the network, together with signalling data for the real traffic, it may be analysed in a number of ways, and optionally either aggregated for different sessions or mobile devices and/or split out by one or more of the measurement data variables.

The skilled person will appreciate that the measurement data relating to the real traffic may be sent at a later time than the real traffic, or the agent may open another session concurrently with the real traffic and send the measurement data at the same time as the real traffic. This latter arrangement facilitates near real-time performance monitoring for the network, and since the quantity of measurement data is generally relatively small, typically just a few bytes, the monitored session is hardly affected.

No doubt many other effective alternatives will occur to the skilled person and it will be understood that the invention is not limited to the described embodiments and encompasses modifications apparent to those skilled in the art lying within the spirit and scope of the claims appended hereto.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A method of providing performance information for a digital mobile phone network, the method comprising:
    using a digital mobile phone of a subscriber of said network to perform measurements of quality of service (QoS) for real subscriber traffic for a service provided to said subscriber by an operator of said network, said real subscriber traffic not being test traffic;
    generating QoS data in said digital mobile phone from said quality of service (QoS) measurements; and
    sending said QoS data into said digital mobile phone network to provide said performance information;
    wherein said subscriber comprises a human user of said digital mobile phone; and
    wherein said digital mobile phone includes a processor and memory coupled to said processor, said memory storing program code including code for providing said service to said subscriber and monitoring agent code, and wherein the method further comprises:
    using said monitoring agent code in said digital mobile phone to monitor said real subscriber traffic for said human user of said service to perform said QoS measurements and to generate said QoS data for sending into said digital mobile phone network;
    decoding a protocol stack of said traffic to read signalling data associated with said traffic and using said signalling data to analyze said QoS data; and
    determining radio resources allocated to said real subscriber traffic and displaying said radio resources in association with said QoS data, displaying both together on the same display as a function of time to provide graphical indication of a degree of correlation between a variation in a said QoS measurement of said real subscriber traffic at a time and a variation in said radio resources allocated to said traffic at substantially the same said time, such that it can be determined whether a degradation in Quality of service is linked to said allocating of said radio resources.

2. The method as claimed in claim 1 further comprising computing, in said digital mobile phone, statistics relating to said real subscriber traffic, and sending said statistics into said digital mobile phone network, and wherein said QoS data comprises said statistics.

3. The method as claimed in claim 2 further comprising aggregating said statistics, and sending said aggregated statistics into said digital mobile phone network, and wherein said QoS data comprises said aggregated statistics.

4. The method as claimed in claim 2 wherein said statistics are able to be aggregated and separated out by one or more variables including a service type variable defining a type of said service provided to said subscriber.

5. The method as claimed in claim 2 wherein said service provided to said user comprises one or more of an email service, a web browsing service and a video streaming service, and wherein said QoS data comprises one or both of throughput measurement data and latency measurement data.

6. The method as claimed in claim 2 further comprising using said monitoring agent code to retrieve data relating to said real subscriber traffic from other software elements within said digital mobile phone and to compute said statistics relating to said real subscriber traffic using said data retrieved from said other software elements.

7. The method as claimed in claim 2 wherein said QoS data is sent into said digital mobile phone network by operating one or more state machines in the digital mobile phone.

8. The method as claimed in claim 6 wherein said data retrieved from said other software elements comprises network layer data.

9. The method as claimed in claim 6 wherein said data retrieved from said other software elements comprises application layer data.

10. The method as claimed in claim 6 wherein said data retrieved from said other software elements comprises raw data carried on said network.

11. The method as claimed in claim 1 wherein said using further comprises using said digital mobile phone to perform said measurements of quality of service (QoS) using raw data extracted at a low level in said digital mobile phone.

12. The method as claimed in claim 11 wherein said raw data extracted at a low level comprises network layer data.

13. The method as claimed in claim 1 wherein said sending of said QoS data comprises sending said QoS data to a remote destination in a second stream of traffic in addition to said real subscriber traffic.

14. The method as claimed in claim 1 wherein said QoS data comprises data derived from a count of a number of protocol errors associated with said real subscriber traffic of said digital mobile phone.

15. The method as claimed in claim 1 further comprising using said digital mobile phone to receive commands over said network for said providing of said performance information.

16. The method as claimed in claim 1 further comprising capturing GPS position information for said digital mobile phone and sending said GPS position information into said digital mobile phone network to provide performance information comprising said QoS data together with said GPS position information.

17. The method as claimed in claim 1 further comprising using said monitoring agent code to collect performance information from a plurality of sources accessible using said digital mobile phone, said performance information including said QoS data; forming said performance information from said plurality of sources into a combined stream; and sending said combined stream into said digital mobile phone network to provide said performance information.

* * * * *